United States Patent
Mochizuki

Patent Number: 5,970,172
Date of Patent: *Oct. 19, 1999

[54] HADAMARD TRANSFORM CODING/DECODING DEVICE FOR IMAGE SIGNALS

[75] Inventor: Takashi Mochizuki, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/768,589

[22] Filed: Dec. 18, 1996

[30] Foreign Application Priority Data

Dec. 28, 1995 [JP] Japan .................................. 7-343692

[51] Int. Cl.⁶ .................................................. G06K 9/36
[52] U.S. Cl. ........................................... 382/233; 382/248
[58] Field of Search .................................. 382/248, 281, 382/251, 238, 277, 245, 239, 233; 364/725.01; 348/395

[56] References Cited

U.S. PATENT DOCUMENTS

| | | | |
|---|---|---|---|
| 4,797,944 | 1/1989 | Tanaka ........................................ | 382/238 |
| 4,922,544 | 5/1990 | Stansfield et al. ........................ | 382/277 |
| 5,043,809 | 8/1991 | Shikakura et al. ........................ | 382/238 |
| 5,054,103 | 10/1991 | Yasuda et al. ............................. | 382/233 |
| 5,166,987 | 11/1992 | Kageyama .................................. | 382/56 |
| 5,319,724 | 6/1994 | Blonstein et al. ........................ | 382/277 |
| 5,625,714 | 4/1997 | Fukuda ....................................... | 382/239 |
| 5,719,963 | 2/1998 | Kazui et al. ............................... | 382/281 |

FOREIGN PATENT DOCUMENTS 1-33992  7/1989  Japan .
3-289282  12/1991  Japan .

OTHER PUBLICATIONS

Shin–nihon ITU Kyoukai, ITU White Book; pp. 169–170, Jan. 1994.
Fukinuke, "Digital Signal Processing of Images", Nikkan Kogyo Shinbunsha, (1992), pp. 181–193.
Fukinuke, "Multidimensional Signal Processing of TV Signals", Nikkan Kogyo Shinbunsha, (1988), pp. 247–250.
International Standard: "Information Technology–Digital Compression and Coding of Continuous–tone Still Images: Requirements and Guidelines", ISO/IEC 10918–1, 1st Edition, (1994), pp. 176–177.

*Primary Examiner*—Amelia Au
*Assistant Examiner*—Samir Ahmed
*Attorney, Agent, or Firm*—Foley & Lardner

[57] ABSTRACT

In a Hadamard transform coding device, input image signals are first subjected to Hadamard transform. After the Hadamard transform, the DC coefficients are subjected to variable-length coding, and the AC coefficients are subjected to variable-length coding after the output of an AC coefficient predictor is subtracted therefrom. The AC coefficient predictor predicts the AC coefficients of a center block on the basis of the DC coefficients of the adjacent blocks. In a Hadamard transform decoding device, the DC coefficients are first subjected to variable-length decoding. An AC coefficient predictor predicts the AC coefficients of the center block on the basis of the DC efficient of the adjacent blocks. Thereafter, the AC coefficient prediction error is subjected to variable-length decoding, and added with the output of the AC coefficient predictor to obtain the AC coefficients. The transform coefficients thus obtained are subjected to Hadamard inverse-transform to obtain image signals.

6 Claims, 12 Drawing Sheets

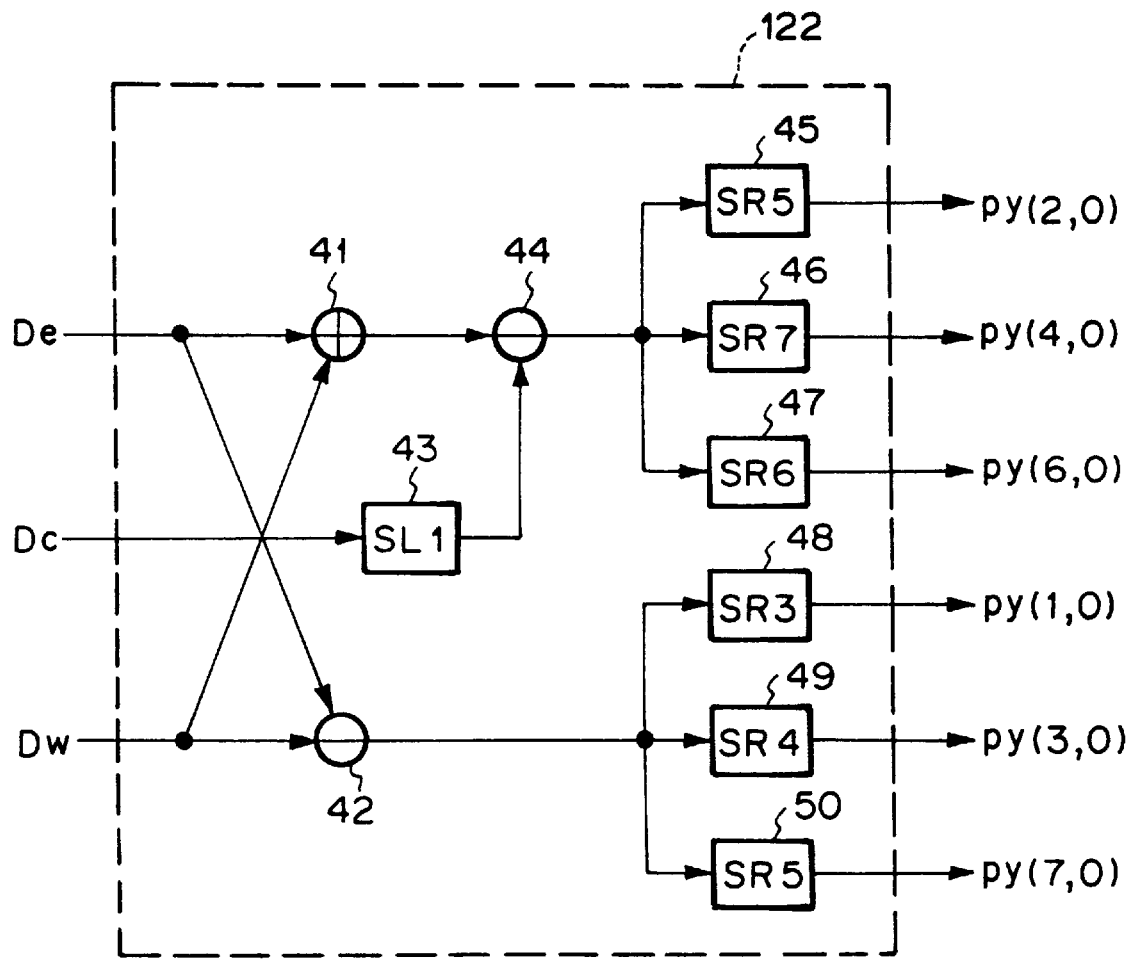
F I G. 6

F I G. 8
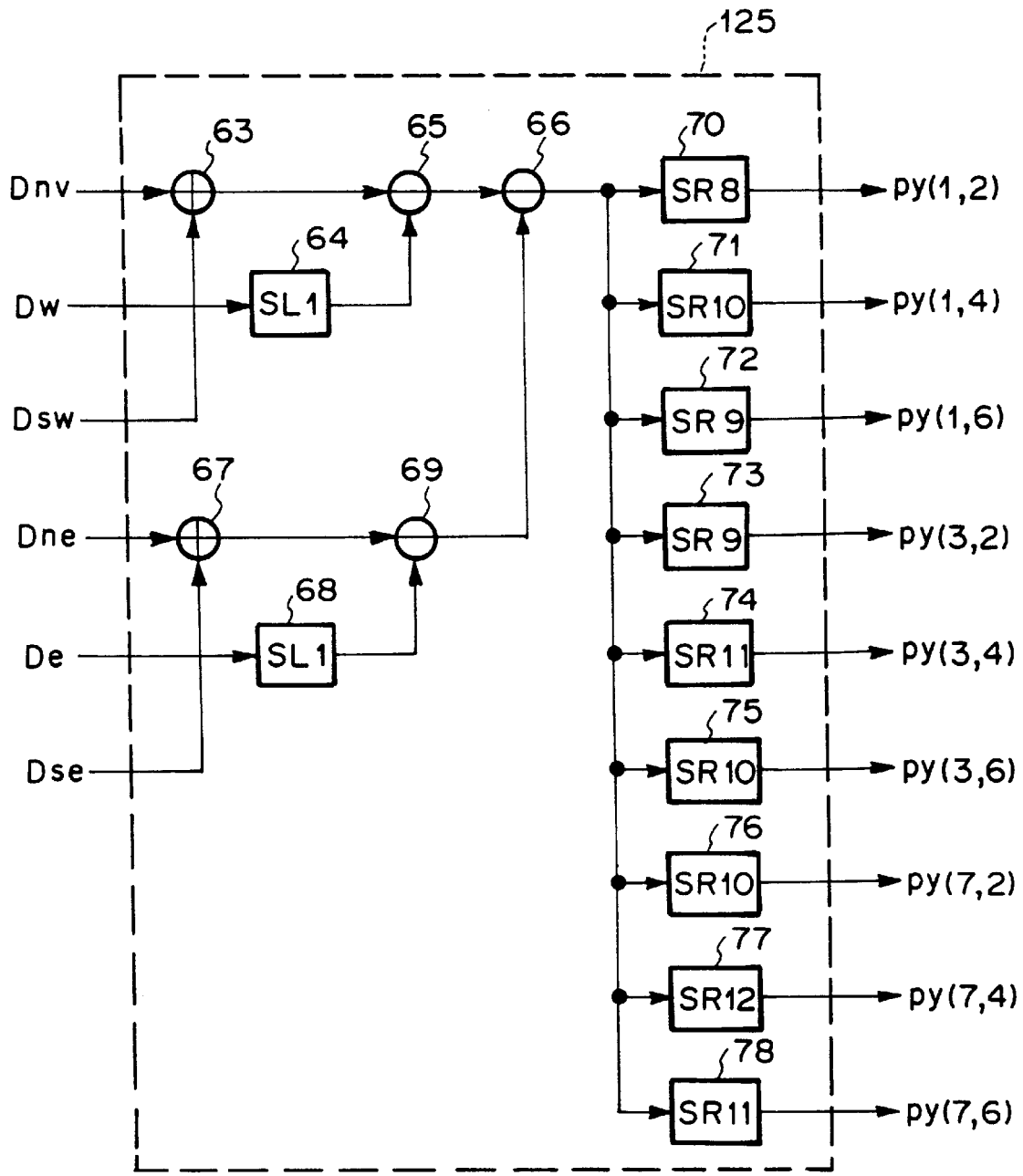

HADAMARD TRANSFORM CODING/ DECODING DEVICE FOR IMAGE SIGNALS

BACKGROUND OF THE INVENTION

1. Field of the present invention

The present invention relates to a Hadamard transform coding/decoding device for image signals using two-dimensional Hadamard transform.

2. Description of the Related Art

A Hadamard transform coding technique for image signals is described in "DIGITAL SIGNAL PROCESSING OF IMAGES—enlarged edition—"by Takahiko Fukinuke, pp181–193 (issued on Jan. 27, 1992 by Nikkan Kogyo Shinbunsha), and "MULTIDIMENSIONAL SIGNAL PROCESSING OF TV SIGNALS" by Takahiko Fukinuke, pp247–250 (issued on Nov. 15, 1988, first edition by Nikkan Kogyo Shinbunsha).

Now, representing image data of 8 rows and 8 columns (8×8) by a matrix X=[x(i,j)], (i=0,1, ..., 7; j=0,1, ..., 7), a matrix Y of the transform coefficients of the two-dimensional (8×8)-th order Hadamard transform (=[y(h,v)]) is calculated according to Y=HXH/8 (h=0,1, ..., 7; v=0,1, ...,7). Here, H is represented by the following matrix:

$$H = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \quad \text{[Equation 1]}$$

Here, the Hadamard inverse-transform is represented by X=HYH/8.

Furthermore, with respect to the coding based on a two-dimensional (8×8)-th order discrete cosine transform (DCT), the ITU-T recommendation T.81 or ISO/IEC standard 10918-1 describes a manner of predicting AC coefficients of a block concerned on the basis of the DC coefficients of the block concerned and adjacent blocks to reduce a coding amount. According to this coding amount reducing manner, the image waveform of each block is approximated by the following equation 2, and the transform coefficient of the approximated waveform is set as a prediction value.

$$f(i,j) = A1 i^2 j^2 + A2 i^2 j + A3 ij^2 + A4 i^2 + A5 ij + A6 j^2 + A7 i + A8 j + A9 \quad (2)$$

The constants A1, A2, ..., A9 of the above equation (2) are set so that the DC coefficient of the approximate waveform in the block concerned and eight blocks adjacent to the block concerned is coincident with the actual DC coefficient. In the ITU-T recommendation T.81 is provided a prediction equation for five AC coefficients in a low area. That is, representing the DC coefficient of the block concerned by Dc and representing the DC coefficients of the adjacent eight blocks by Dnw (northwest) at left-and-upper side, Dn (north) at upper side, Dne (northeast) at right-and-upper side, Dw (west) at left side, De (east) at right side, Dsw (southwest) at left-and-lower side, Ds (south) at lower side and Dse (southeast) at right-and-lower side, the prediction value of a transform coefficient of first-order in the horizontal direction and zero-order in the vertical direction is set to 36 (Dw-De)/256, the prediction value of a transform coefficient of second-order in the horizontal direction and zero-order in the vertical direction is set to 9(Dw-2Dc+De)/256, the prediction value of a transform coefficient of zero-order in the horizontal direction and first-order in the vertical direction is set to 36 (Dn-Ds)/256, the prediction value of a transform coefficient of first-order in the horizontal direction and first-order in the vertical direction is set to 5(Dnw-Dne-Dsw+Dse)/256, and the prediction value of a transform coefficient of zero-order in the horizonal direction and second-order in the vertical direction is set to 9(Dn-2Dc+Ds)/256. The prediction values as described above are optimized by the DCT (discrete cosine transform).

However, since the Hadamard transform based on the prior art as described above is considered to have no perfect reversibility in the case of DCT, it is not effective to directly apply the prediction equation of the DCT to the Hadamard transform, and it is required to optimize the prediction equation for the Hadamard transform.

Japanese Post-examined publication (Kokai) No. Hei-1-33992 "ORTHOGONAL TRANSFORM CODING DEVICE" and Japanese Laid-open Patent Application No. Hei-3-289282 "HIGH-EFFICIENT CODING DEVICE FOR IMAGE DATA" are known as prior art which belong to the related technical field as the present invention. However, since these prior art references use the same order transform coefficient for the prediction of image signals, they are different from the present invention.

SUMMARY OF THE INVENTION

An object of the present invention is to provide a Hadamard transform coding/decoding device for image signals, in which the amount of information of transform coefficients to be recorded/transmitted can be reduced in a coding process using two-dimensional Hadamard transform.

In order to attain the above object, a Hadamard transform coding device for image signals according to a first aspect of the present invention, includes Hadamard transform means for performing two-dimensional Hadamard transform on input image signals, DC coefficient variable-length coding means for performing variable-length coding processing on DC coefficients obtained by the Hadamard transform means, AC coefficient prediction means for predicting AC coefficients of a block concerned on the basis of the DC coefficients of the block concerned and blocks adjacent to the block concerned, subtracting means for subtracting the output of the AC coefficient predicting means from the AC coefficients which are obtained by the Hadamard transform means, and AC coefficient variable-length coding means for performing variable-length coding on the output of the subtraction means.

In order to attain the above object, a Hadamard transform coding device for image signals according to a second aspect of the present invention, includes Hadamard transform means for performing two-dimensional Hadamard transform on input image signals, DC coefficient quantizing means for quantizing DC coefficients obtained by the Hadamard transform means, DC coefficient variable-length coding means for performing variable-length coding processing on the quantized DC coefficients obtained by the DC coefficient quantizing means, DC coefficient inversely-quantizing means for inversely quantizing the quantized DC coefficients, AC coefficient predicting means for predicting AC coefficients of a block concerned on the basis of the inversely-quantized DC coefficients of the block concerned and blocks adjacent to the block concerned, which are obtained by the DC coefficient inversely-quantizing means, subtracting means for subtracting the output of the AC coefficient predicting means from the AC coefficients obtained by the Hadamard transform means, AC coefficient quantizing means for quantizing the output of the subtracting means, and AC coefficient variable-length coding means for performing variable-length coding processing on the output of the AC coefficient quantizing means.

In order to attain the above object, a Hadamard transform coding device according to a third aspect of the present invention, includes Hadamard transform means for performing two-dimensional Hadamard transform on input image signals, DC coefficient quantizing means for quantizing DC coefficients obtained by the Hadamard transform means, DC coefficient variable-length coding means for performing variable-length coding processing on the quantized DC coefficients obtained by the DC coefficient quantized means, DC coefficient inversely-quantizing means for inversely quantizing the quantized DC coefficients, AC coefficient predicting means for predicting AC coefficients of a block concerned on the basis of the inversely-quantized DC coefficients of the block concerned and blocks adjacent to the block concerned, which are obtained by the DC coefficient inversely-quantizing means, AC coefficient predicting value quantizing means for quantizing the output of the AC coefficient predicting means, AC coefficient quantizing means for quantizing the AC coefficients obtained by the Hadamard transform means, subtracting means for subtracting the output of the AC coefficient predicting value quantizing means from the output of the AC coefficient quantizing means, and AC coefficient variable-length coding means for performing variable-length coding processing on the output of the subtraction means.

With respect to the two-dimensional (8×8)-th order Hadamard transform coefficients, the AC coefficient predicting means may be input with the DC coefficient Dc of the block concerned, the DC coefficient Dn of a block located just above the block concerned (hereinafter referred to as "just-above block"), the DC coefficient Ds of a block located just below the block concerned (hereinafter referred to as "just-below block"), the DC coefficient Dw of a block just preceding to the block concerned (hereinafter referred to as "just-preceding block"), the DC coefficient De of a block just subsequent to the block (hereinafter referred to as "just-subsequent block"), and may output as a prediction value of the transform coefficient of M-th order in a horizontal direction and zero-order in a vertical direction:

(Dw-De)/8 for M=1;
(Dw-2Dc+De)/32 for M=2;
(Dw-De)/16 for M=3; 1
(Dw-2Dc+De)/128 for M=4; 1
(Dw-2Dc+De)/64 for M=6; and
(Dw-De)/32 for M=7, and as a prediction value of the transform coefficient of zero-order in the horizontal direction and N-th order in the vertical direction:

(Dn-Ds)/8 for N=1;
(Dn-2Dc+Ds)/32 for N=2;
(Dn-Ds)/16 for N=3;
(Dn-2Dc+Ds)/128 for N=4;
(Dn-2Dc+Ds)/64 for N=6; and
(Dn-Ds)/32 for N=7.

Furthermore, the AC coefficient predicting means may be input with the DC coefficient Dnw of a block at the upper-and-left (northwest) side of the block concerned (hereinafter referred to as "upper-left block"), the DC coefficient Dne of a block at the upper-and-right (northeast) side of the block concerned (hereinafter referred to as "upper-right block"), the DC coefficient Dsw of a block at a block at the lower-and-left (southwest) side of the block concerned (hereinafter referred to as "lower-left block"), and the DC coefficient Dse of a block at a lower-and-right (southeast) side of the block concerned (hereinafter referred to as "lower-right block"), and output as a prediction value of the transform coefficient of M-th order in the horizontal direction and N-th order in the vertical direction:

(Dnw-Dne-Dsw+Dse)/64 for M=1, N=1;
(Dnw-Dne-Dsw+Dse)/128 for M=1, N=3;
(Dnw-Dne-Dsw+Dse)/256 for M=1, N=7;
(Dnw-Dne-Dsw+Dse) for M=3, N=1;
(Dnw-Dne-Dsw+Dse)/256 for M=3, N=3;
(Dnw-Dne-Dsw+Dse)/512 for M=3, N=7;
(Dnw-Dne-Dsw+Dse)/256 for M=7, N=1;
(Dnw-Dne-Dsw+Dse)/512 for M=7, N=3; and
(Dnw-Dne-Dsw+Dse)/1024 for M=7, N=7.

Still furthermore, the AC coefficient predicting means may be input with the DC coefficient Dc of the block concerned, the DC coefficient Dnw of the upper-left block, the DC coefficient Dn of the just-above block, the DC coefficient Dne of the just-upper-right block, the DC coefficient Dw of the just-preceding block, the DC coefficient De of the just-subsequent block, the DC coefficient Dsw of the lower-left block, the DC coefficient Ds of the just-below block, and the DC coefficient Dse of the lower-right block, and may output as a prediction value of the transform coefficient of M-th order in the horizontal direction and N-th order in the vertical direction:

(Dnw-2Dw+Dsw-Dne+2De-Dse)/256 for M=1, N=2;
(Dnw-2Dw+Dsw-Dne+2De-Dse)/1024 for M=1, N=4;
(Dnw-2Dw+Dsw-Dne+2De-Dse)/512 for M=1, N=6;
(Dnw-2Dn+Dne-Dsw+2Ds-Dse)/256 for M=2, N=1;
(Dnw-2Dn+Dne-2Dw+4Dc-2De+Dsw-2Ds+Dse)/1024 for M=2, N=2;
(Dnw-2Dn+Dne-Dsw+2Ds-Dse)/512 for M=2, N=3;
(Dnw-2Dn+Dne-2Dw+4Dc-2De+Dsw-2Ds+Dse)/4096 for M=2, N=4;
(Dnw-2Dn+Dne-2Dw+4Dc-2De+Dsw-2Ds+Dse)/2048 for M=2, N=6;
(Dnw-2Dn+Dne-Dsw+2Ds-Dse)/1024 for M=2, N=7;
(Dnw-2Dw+Dsw-Dne+2De-Dse)/512 for M=3, N=2;
(Dnw-2Dw+Dsw-Dne+2De-Dse)/2048 for M=3, N=4;
(Dnw-2Dw+Dsw-Dne+2De-Dse)/1024 for M=3, N=6;
(Dnw-2Dn+Dne-Dsw+2Ds-Dse)/1024 for M=4, N=1;
(Dnw-2Dn+Dne-2Dw+4Dc-2De+Dsw-2Ds+Dse)/4096 for M=4, N=2;
(Dnw-2Dn+Dne-Dsw+2Ds-Dse)/2048 for M=4, N=3;
(Dnw-2Dn+Dne-2Dw+4Dc-2De+Dsw-2Ds+Dse)/16384 for M=4, N=4;
(Dnw-2Dn+Dne-2Dw+4Dc-2De+Dsw-2Ds+Dse)/8192 for M=4, N=6;
(Dnw-2Dn+Dne-Dsw+2Ds-Dse)/4096 for M=4, N=7;
(Dnw-2Dn+Dne-Dsw+2Ds-Dse)/512 for M=6, N=1;
(Dnw-2Dn+Dne-2Dw+4Dc-2De+Dsw-2Ds+Dse)/2048 for M=6, N=2;
(Dnw-2Dn+Dne-Dsw+2Ds-Dse)/1024 for M=6, N=3;
(Dnw-2Dn+Dne-2Dw+4Dc-2De+Dsw-2Ds+Dse)/8192 for M=6, N=4;
(Dnw-2Dn+Dne-2Dw+4Dc-2De+Dsw-2Ds+Dse)/4096 for M=6, N=6;

(Dnw-2Dn+Dne-Dsw+2Ds-Dse)/2048 for M=6, N=7;
(Dnw-2Dw+Dsw-Dne+2De-Dse)/1024 for M=7, N=2;
(Dnw-2Dw+Dsw-Dne+2De-Dse)/4096 for M=7, N=4; and
(Dnw-2Dw+Dsw-Dne+2De-Dse)/2048 for M=7, N=6.

A Hadamard transform decoding device for image signals according to a fourth aspect of the present invention includes DC coefficient variable-length decoding means for performing variable-length decoding processing on DC coefficients which have been subjected to variable-length coding processing, AC coefficient variable-length decoding means for performing variable-length decoding processing on an AC coefficient prediction error which has been subjected to variable-length coding processing, AC coefficient predicting means for predicting the AC coefficients of a block concerned on the basis of the DC coefficients of the block concerned and blocks adjacent to the block concerned which are obtained by the DC coefficient variable-length decoding means, adding means for adding the output of the AC coefficient predicting means with the output of the AC coefficient variable-length decoding means, and Hadamard inverse-transform means for performing Hadamard inverse-transform on the DC coefficient obtained by the DC coefficient variable-length decoding means and the AC coefficients obtained by the adding means every block.

A Hadamard transform decoding device for image signals according to a fifth aspect of the present invention includes DC coefficient variable-length decoding means for performing variable-length decoding processing on quantized DC coefficients which have been subjected to the variable-length coding processing, DC coefficient inversely quantizing means for inversely quantizing the quantized DC coefficients obtained by the DC coefficient variable-length decoding means, AC coefficient variable-length decoding means for performing the variable-length decoding on a quantized AC coefficient prediction error which has been subjected to the variable-length coding processing, AC coefficient inversely quantizing means for inversely quantizing the quantized AC coefficient prediction error which is obtained by the AC coefficient variable-length decoding means, AC coefficient predicting means for predicting AC coefficients of a block concerned on the basis of the inversely-quantized DC coefficients of the block concerned and blocks adjacent to the block concerned which are obtained by the DC coefficient inversely quantizing means, adding means for adding the output of the AC coefficient prediction means with the output of the AC coefficient inversely quantizing means, and Hadamard inverse-transform means for performing Hadamard inverse-transform on the inversely quantized DC coefficients and the AC coefficients obtained by the adding means every block.

A Hadamard transform decoding device for image signals according to a sixth aspect of the present invention, includes a DC coefficient variable-length decoding means for performing variable-length decoding processing on quantized DC coefficients which have been subjected to variable-length coding processing, DC coefficient inversely quantizing means for inversely quantizing the quantized DC coefficients obtained by the DC coefficient variable-length decoding means, AC coefficient predicting means for predicting AC coefficients of a block concerned on the basis of the inversely quantized DC coefficients of the block concerned and blocks adjacent to the block concerned which are obtained by the DC coefficient inversely quantizing means, AC coefficient prediction value quantizing means for quantizing the output of the AC coefficient predicting means, AC coefficient variable-length decoding means for performing variable-length decoding processing on a quantized AC coefficient prediction error which has been subjected to the variable-length coding processing, adding means for adding the output of the AC coefficient variable-length decoding means with the output of the AC coefficient prediction value quantizing means, AC coefficient inversely quantizing means for inversely quantizing the output of the adding means, and Hadamard inverse-transform means for performing Hadamard inverse transform on the inversely quantized DC coefficients and the AC coefficients obtained by the AC coefficient inversely-quantizing means every block.

With respect to the Hadamard transform coefficients of two-dimensional (8×8)-th order, the AC coefficient predicting means may be input with the DC coefficient Dc of the block concerned, the DC coefficient Dn of a just-above block, the DC coefficient Ds of a just-below block, the DC coefficient Dw of a just-preceding block, and the DC coefficient De of a just-subsequent block, and may output as a prediction value of the transform coefficient of M-th order in the horizontal direction and zero-order in the vertical direction:

(Dw-De)/8 for M=1;
(Dw-2Dc+De)/32 for M=2;
(Dw-De)/16 for M=3;
(Dw-2Dc+De)/128 for M=4;
(Dw-2Dc+De)/64 for M=6; and
(Dw-De)/32 form M=7, and may output as a prediction value of the transform coefficient of zero-order in the horizontal direction and n-th order in the vertical direction:

(Dn-Ds)/8 for N=1;
(Dn-2Dc+Ds)/32 for N=2;
(Dn-Ds)/16 for N=3;
(Dn-2Dc+Ds)/128 for N=4;
(Dn-2Dc+Ds)/64 for N=6; and
(Dn-Ds)/32 for N=7.

Furthermore, the AC coefficient predicting means may be input with the DC coefficient Dnw of an upper-left block, the DC coefficient Dne of an upper-right block,the DC coefficient Dsw of a lower-left block, and the DC coefficient Dse of a lower-right block, and may output as a prediction value of the transform coefficient of M-th order in the horizontal direction and N-th order in the vertical direction:

(Dnw-Dne-Dsw+Dse)/64 for M=1, N=1;
(Dnw-Dne-Dsw+Dse)/128 for M=1, N=3;
(Dnw-Dne-Dsw+Dse)/256 for M=1, N=7;
(Dnw-Dne-Dsw+Dse)/128 for M=3, N=1;
(Dnw-Dne-Dsw+Dse)/256 for M=3, N=3;
(Dnw-Dne-Dsw+Dse)/512 for M=3, N=7;
(Dnw-Dne-Dsw+Dse)/256 for M=7, N=1;
(Dnw-Dne-Dsw+Dse)/512 for M=7, N=3; and
(Dnw-Dne-Dsw+Dse)/1024 for M=7, N=7.

Still furthermore, the AC coefficient predicting means may be input with the DC coefficient Dc of the block concerned, the DC coefficient Dnw of an upper-left block, the DC coefficient Dn of a just-above block, the DC coefficient Dne of an upper-right block, the DC coefficient Dw of a just-preceding block, the DC coefficient De of a just-subsequent block, the DC coefficient Dsw of a lower-left block, the DC coefficient Ds of a just-below block, and the DC coefficient Dse of a lower-right block, and may output as a prediction value of the transform coefficient of M-th order in the horizontal direction and N-th order in the vertical direction:

(Dnw-2Dw+Dsw-Dne+2De-Dse)/256 for M=1, N=2;
(Dnw-2Dw+Dsw-Dne+2De-Dse)/1024 for M=1, N=4;
(Dnw-2Dw+Dsw-Dne+2De-Dse)/512 for M=1, N=6;
(Dnw-2Dn+Dne-Dsw+2Ds-Dse)/256 for M=2, N=1;
(Dnw-2Dn+Dne-2Dw+4Dc-2De+Dsw-2Ds+Dse)/1024 for M=2, N=2;
(Dnw-2Dn+Dne-Dsw+2Ds-Dse)/512 for M=2, N=3;
(Dnw-2Dn+Dne-2Dw+4Dc-2De+Dsw-2Ds+Dse)/4096 for M=2, N=4;
(Dnw-2Dn+Dne-2Dw+4Dc-2De+Dsw-2Ds+Dse)/2048 for M=2, N=6;
(Dnw-2Dn+Dne-Dsw+2Ds-Dse)/1024 for M=2, N=7;
(Dnw-2Dw+Dsw-Dne+2De-Dse)/512 for M=3, N=2;
(Dnw-2Dw+Dsw-Dne+2De-Dse)/2048 for M=3, N=4;
(Dnw-2Dw+Dsw-Dne+2De-Dse)/1024 for M=3, N=6;
(Dnw-2Dn+Dne-Dsw+2Ds-Dse)/1024 for M=4, N=1;
(Dnw-2Dn+Dne-2Dw+4Dc-2De+Dsw-2Ds+Dse)/4096 for M=4, N=2;
(Dnw-2Dn+Dne-Dsw+2Ds-Dse)/2048 for M=4, N=3;
(Dnw-2Dn+Dne-2Dw+4Dc-2De+Dsw-2Ds+Dse)/16384 for M=4, N=4;
(Dnw-2Dn+Dne-2Dw+4Dc-2De+Dsw-2Ds+Dse)/8192 for M=4, N=6;
(Dnw-2Dn+Dne-Dsw+2Ds-Dse)/4096 for M=4, N=7;
(Dnw-2Dn+Dne-Dsw+2Ds-Dse)/512 for M=6, N=1;
(Dnw-2Dn+Dne-2Dw+4Dc-2De+Dsw-2Ds+Dse)/2048 for M=6, N=2;
(Dnw-2Dn+Dne-Dsw+2Ds-Dse)/1024 for M=6, N=3;
(Dnw-2Dn+Dne-2Dw+4Dc-2De+Dsw-2Ds+Dse)/8192 for M=6, N=4;
(Dnw-2Dn+Dne-2Dw+4Dc-2De+Dsw-2Ds+Dse)/4096 for M=6, N=6;
(Dnw-2Dn+Dne-Dsw+2Ds-Dse)/2048 for M=6, N=7;
(Dnw-2Dw+Dsw-Dne+2De-Dse)/1024 for M=7, N=2;
(Dnw-2Dw+Dsw-Dne+2De-Dse)/4096 for M=7, N=4; and
(Dnw-2Dw+Dsw-Dne+2De-Dse)/2048 for M=7, N=6.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 6 is a block diagram showing an embodiment of an predictor 122;

FIG. 8 is a block diagram showing an embodiment of an predictor 125;

DETAILED DESCRIPTION OF THE PREFERRED EMBODIMENTS

A Hadamard transform coding/decoding device for image signals according to the present invention will be described with reference to the accompanying drawings.

Figure 1:
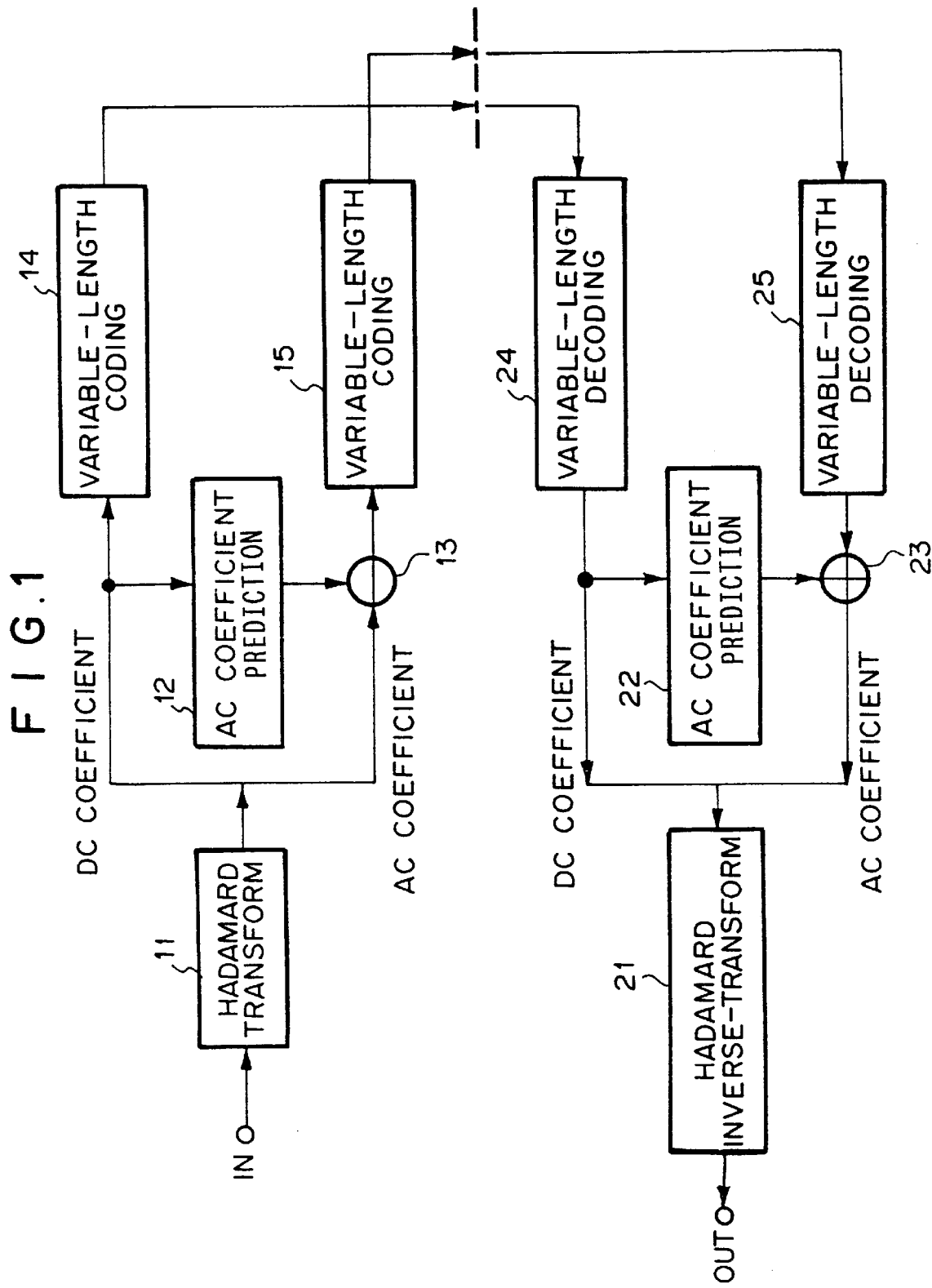
FIG. 1 is a block diagram showing a first embodiment of a coding/decoding device according to the present invention.

FIG. 1 is a block diagram showing a first embodiment of an Hadamard transform coding/decoding device for image signals according to the present invention. The Hadamard transform coding device and the Hadamard transform decoding device of the present invention are constructed by a coding device and a decoding device, respectively. Of these devices, the coding device comprises a Hadamard transformer 11, an AC coefficient predictor 12, a subtracter 13, and variable-length coders 14 and 15. Further, the decoding device comprises a Hadamard inverse transformer 21, an AC coefficient predictor 22, an adder 23, and variable-length decoders 24 and 25.

In the coding device thus constructed, input image signals are subjected to Hadamard transform processing every 8 pixel×8 line in the Hadamard transformer 11. A DC coefficient in the transform coefficients thus obtained is subjected to variable-length coding processing by the variable-length coder 14. With respect to AC coefficients, the output of the AC coefficient predictor 12 is subtracted from the AC coefficients by the subtracter 13, and then the result is subjected to the variable-length coding by the variable-length coder 15. The AC coefficient predictor 12 calculates an AC coefficient prediction value of a block concerned on the basis of the DC coefficients of the block concerned and blocks adjacent to the block concerned (hereinafter referred to as "adjacent blocks"), and then outputs the AC coefficient prediction value thus calculated. The output of the variable-length coders 14 and 15 is recorded on storage media or transmitted through a communication line.

The decoding device performs variable-length decoding processing on the DC coefficients by the variable-length decoder 24. The AC coefficient predictor 22 calculates an AC coefficient prediction value of the blocks concerned on the basis of the DC coefficients of the block concerned and the adjacent block, and then outputs the AC coefficient prediction value thus calculated. Subsequently, the variable-length decoding processing is performed on an AC coefficient prediction error by the variable-length decoder 25, and then the output of the AC coefficient predictor 22 is added to the decoded prediction error signal by the adder 23. The output of the adder 23 is set as decoded AC coefficients. The Hadamard inverse transformer 21 performs Hadamard inverse transform processing on the decoded transform coefficients, and then outputs the processed result.

Figure 2:
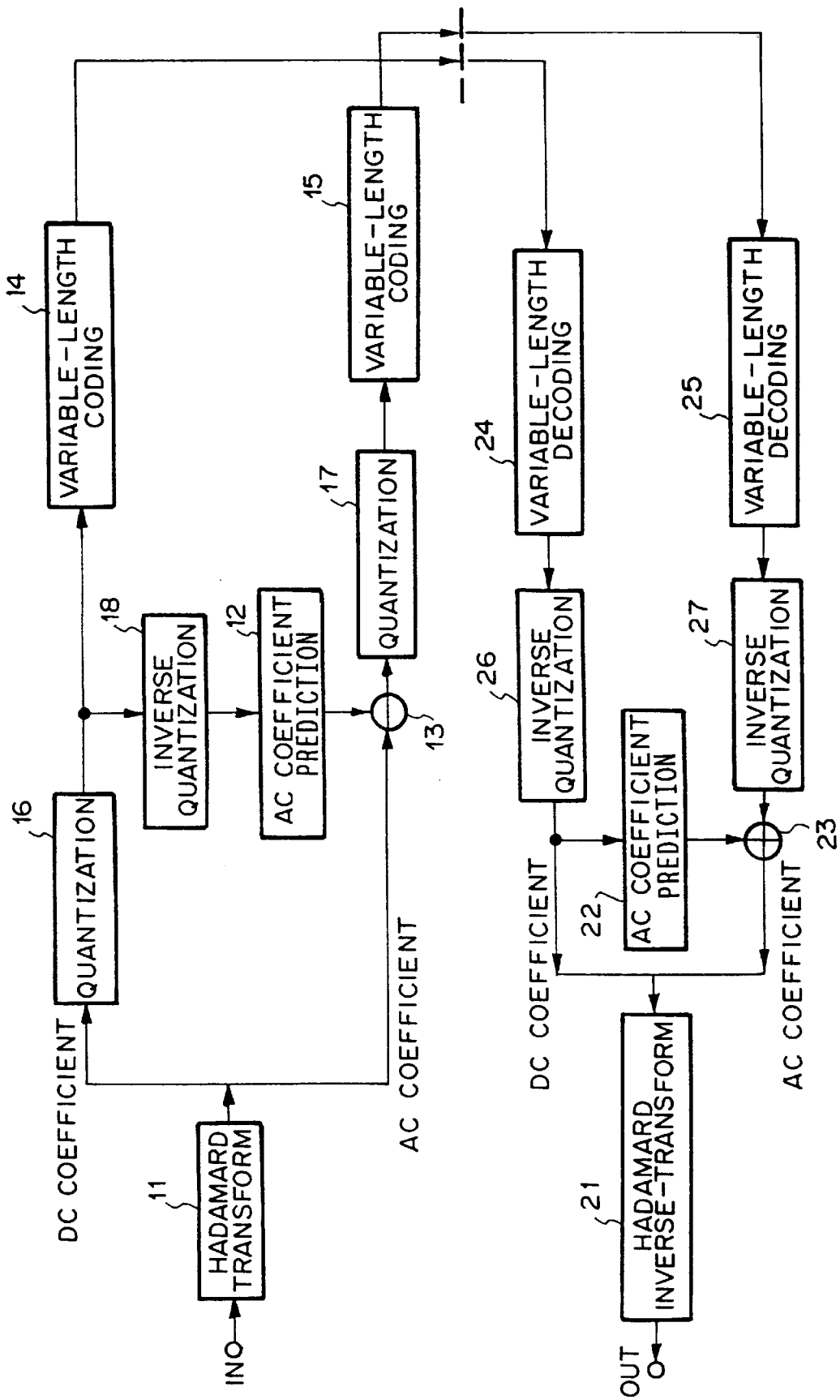
FIG. 2 is a block diagram showing a second embodiment of the coding/decoding device according to the present invention.

FIG. 2 is a block diagram showing a second embodiment of the coding/decoding device of the present invention. In this embodiment, quantization processing is newly added to the first embodiment shown in FIG. 1.

In the coding device, input image signals are subjected to the Hadamard transform every 8 pixel×8 line by the Hadamard transformer 11. The DC coefficients in the transform coefficients thus obtained are quantized by a quantizer 16, and then subjected to the variable-length coding by the variable-length coder 14. With respect to the AC coefficients, the output of the AC coefficient predictor 12 is subtracted from the AC coefficients by the subtracter 13, then quantized by the quantizer 17, and then subjected to the variable-length coding by the variable-length coder 15. In an inverse-quantizer 18, the DC coefficients which are quantized by the quantizer 16 are inversely quantized. In the AC coefficient predictor 12, the AC coefficient prediction value of the block concerned is calculated on the basis of the DC coefficients output from the inverse-quantizer 18.

In the decoding device, the variable-length decoding is performed on the DC coefficients by the variable-length decoder 24, and then the inverse-quantization is performed by the inverse-quantizer 26. In the AC coefficient predictor 22, the AC coefficient prediction value of the block concerned is calculated on the basis of the DC coefficients output from the inverse-quantizer 26, and then output. Subsequently, the AC coefficient prediction error is subjected to the variable-length decoding by the variable-length decoder 25, and then subjected to the inverse quantization by the inverse-quantizer 27. In the adder 23, the output of the inverse-quantizer 27 is added to the output of the AC coefficient predictor 22 to decode the AC coefficients. The Hadamard inverse transformer 21 performs the Hadamard inverse-transform on the decoded transform coefficients, and outputs the result.

Figure 3:
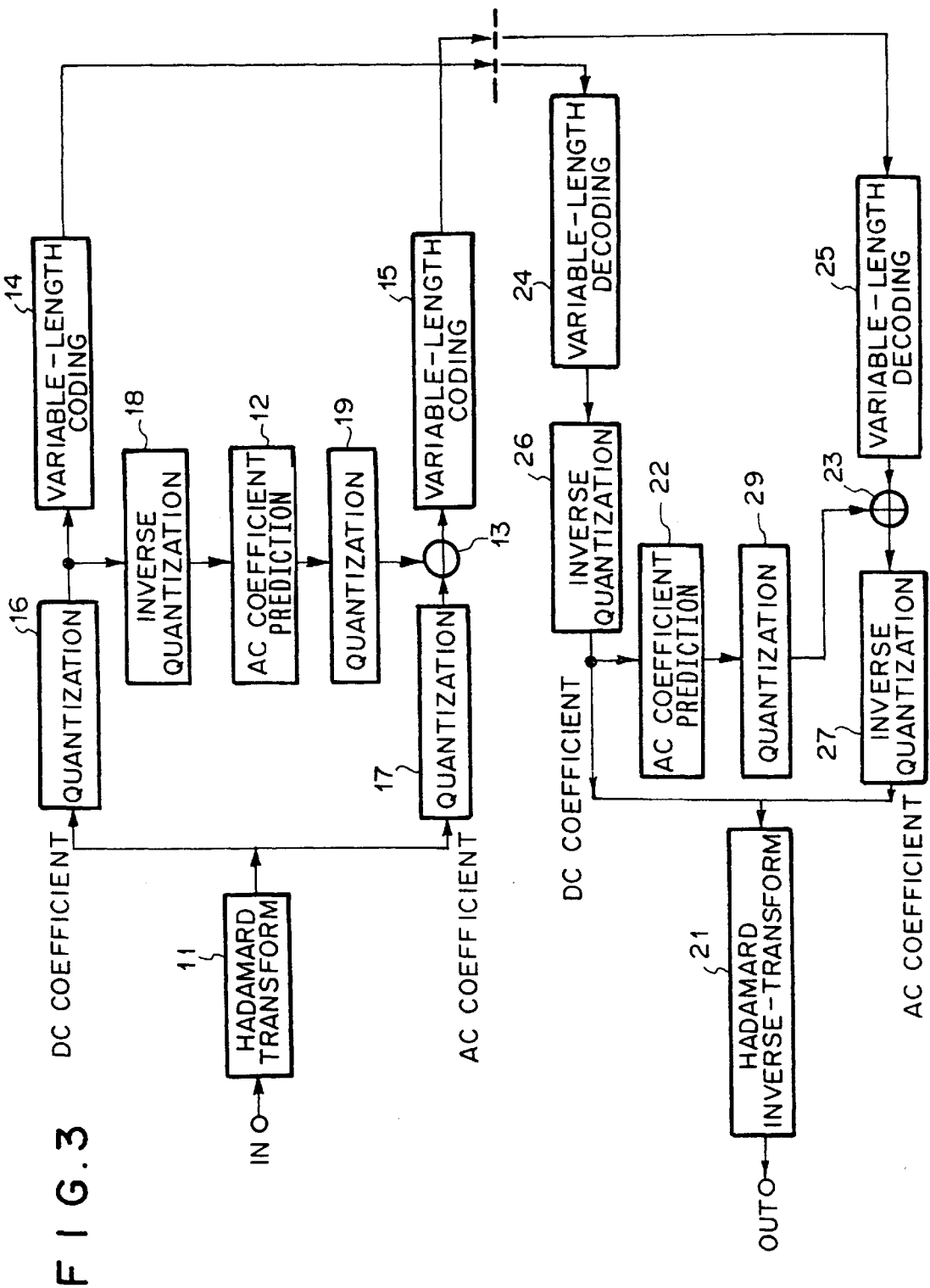
FIG. 3 is a block diagram showing a third embodiment of the coding/decoding device according to the present invention.

FIG. 3 is a block diagram showing a third embodiment of a coding/decoding device according to the present invention. In this embodiment, the quantization of the transform coefficients is newly added to the first embodiment shown in FIG. 1. In addition, the position of the quantizer of this embodiment is different from that of the second embodiment.

In the coding device of this embodiment, the input image signals are subjected to the Hadamard transform every 8 pixel×8 line by the Hadamard transformer 11. The DC coefficients in the transform efficient thus obtained are quantized by the quantizer 16, and then subjected to the variable-length coding by the variable-length coder 14. Further, with respect to the AC coefficients, the AC coefficients are quantized by the quantizer 17, then the output of another quantizer 19 is subtracted from the quantized AC coefficients by the subtracter 13, and then the result is subjected to the variable-length coding by the variable-length coder 15. In the inverse-quantizer 18, the DC coefficients quantized by the quantizer 16 are inversely quantized. In the AC coefficient predictor 12, the AC coefficient prediction value of the block concerned is calculated on the basis of the DC coefficients output from the inverse-quantizer 18, and then output to the quantizer 19. In the quantizer 19, the output of the AC coefficient predictor 12 is quantized.

In the decoding device, the DC coefficients are first subjected to the variable-length decoding by the variable-length decoder 24, and then inversely quantized by the inverse-quantizer 26. In the AC coefficient predictor 22, the AC coefficient prediction value of the block concerned is calculated and output on the basis of the DC coefficients which are output from the inverse-quantizer 26. The output of the AC coefficient predictor 22 is quantized in the quantizer 29. Subsequently, the AC coefficient prediction error is subjected to the variable-length decoding by the variable-length decoder 25, and then added with the output of the quantizer 29 by the adder 23. The inverse-quantizer 27 inversely quantizes the output of the adder 23 to decode the AC coefficients. The Hadamard inverse-transformer 21 performs the Hadamard inverse-transform on the decoded transform coefficients, and then outputs the transformed result.

Figure 4:
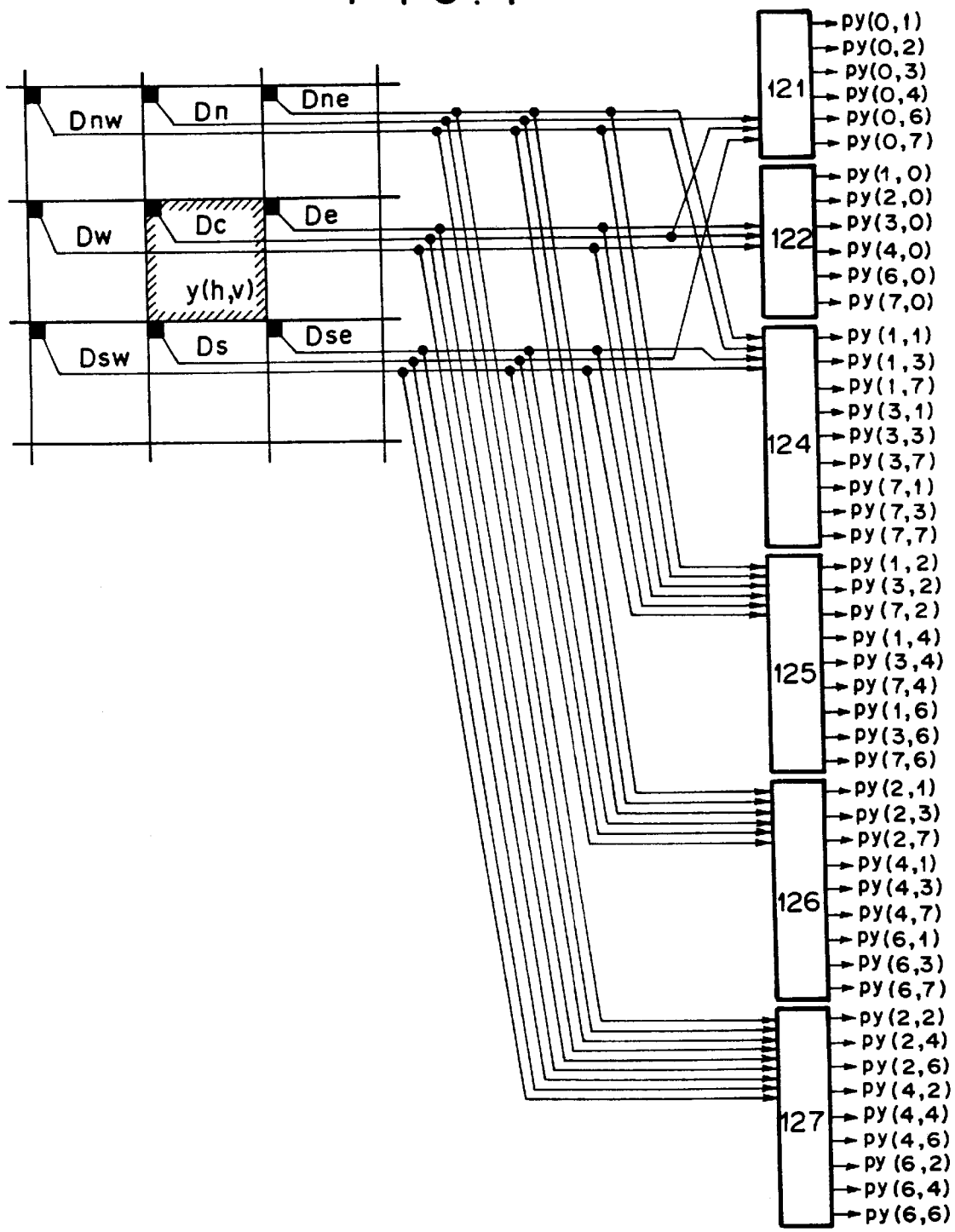
FIG. 4 is a block diagram showing embodiments of AC coefficient predictors 12 and 22.

FIG. 4 is a block diagram showing embodiments of the AC coefficient predictors 12 and 22. The prediction values of 48 AC coefficients of a block at the center (hereinafter referred to as "center block") are calculated on the basis of the DC coefficients Dnw, Dn, Dne, Dw, Dc, De, Dsw, Ds, Dse of the center block and eight blocks adjacent to the center block (i.e.,adjacent blocks) in 3×3 blocks of image signals. The predictor further comprises six predictors 121, 122, 124, 125, 126 and 127.

Figure 5:
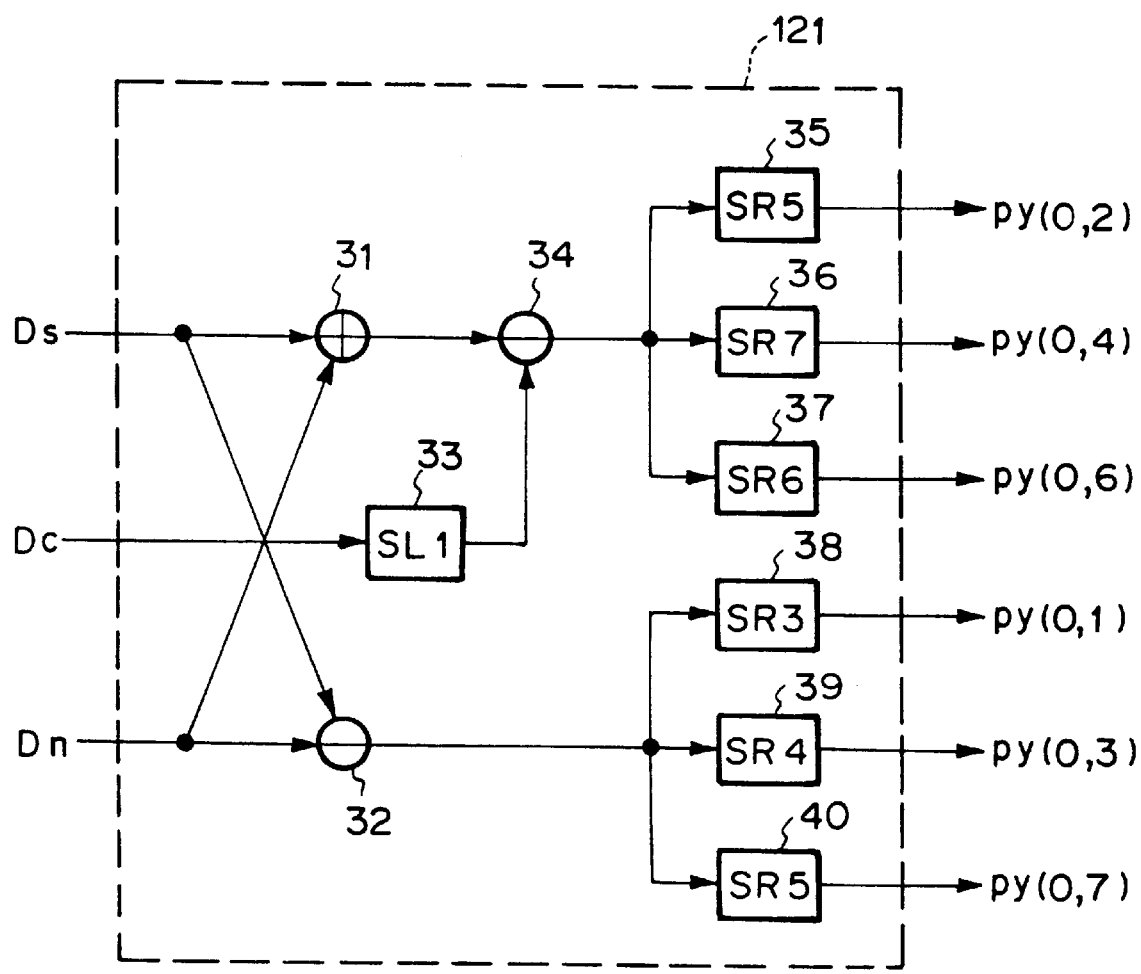
FIG. 5 is a block diagram showing an embodiment of an predictor 121.

FIG. 5 is a block diagram showing the construction of the predictor 121. In this predictor 121, the prediction values of the AC coefficients y(0,1), y(0,2), y(0,3), y(0,4), y(0,6), and (0,7) are calculated on the basis of the DC coefficients Dn, Dc, and Ds of the center block and the upper and lower blocks. An adder 31 adds Dn and Ds, and a subtracter 32 subtracts Ds from Dn. The value of Dc is shifted up by 1 bit in a left shift circuit 33 (SL1).

Figure 11:
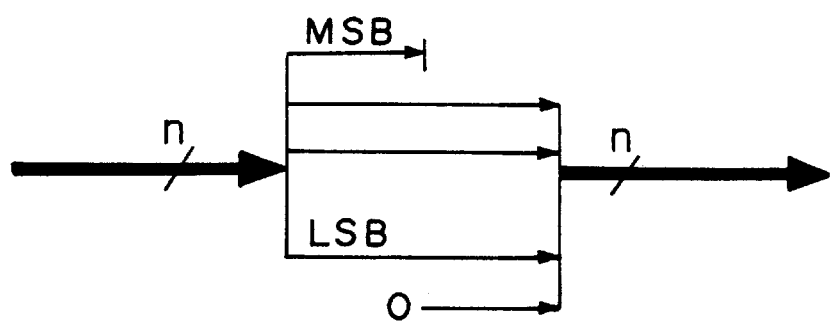
FIG. 11 is a block diagram showing an embodiment of a left shift circuit 33.

FIG. 11 shows the construction of the left shift circuit 33. The MSB of an input signal is discarded, the residual bits are respectively shifted up by 1 bit, and 0 is set to the LSB (Least Significant Bit). In a subtracter 34, the output of the left shift circuit 33 is subtracted from the output of the adder 31. Further, in a right shift circuit 35 (SR5), the output of the subtracter 34 is shifted down by 5 bits, and output as a prediction value of the transform coefficient y (0,2).

Figure 12:
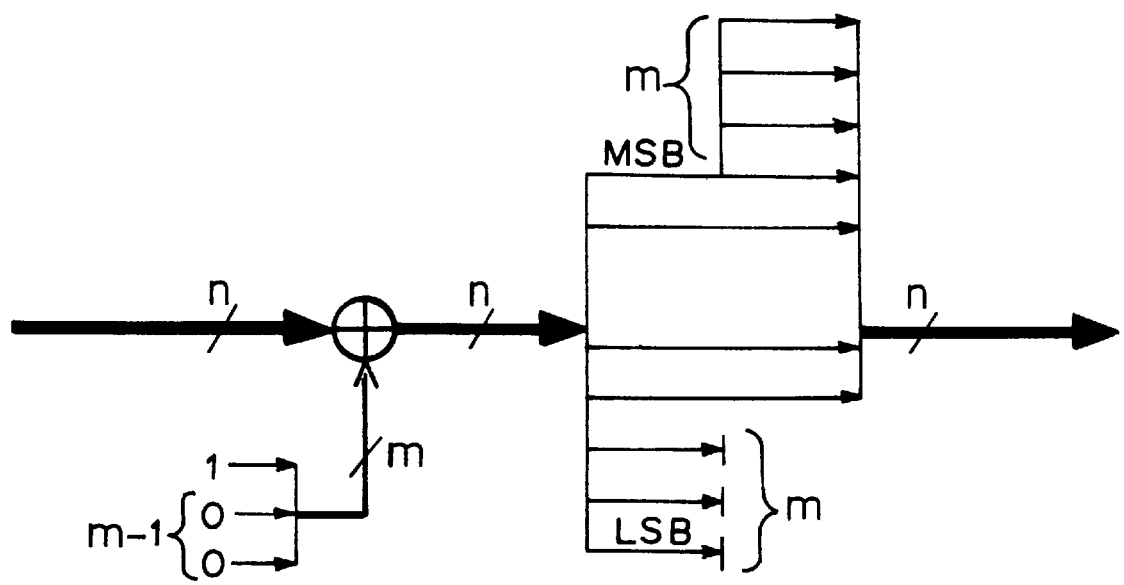
FIG. 12 is a block diagram showing an embodiment of an m-bit right shift circuit.

FIG. 12 shows the construction of an m-bit right shift circuit (SRm). An input signal is added with a constant in which (m−1) lower-digit bits are set to 0 and an m-th bit is set to 1, then the m lower-digit bits are discarded, and then each of the residual bits is shifted down by m bits. The MSB (Most Significant Bit) is copied to m upper-digit bits. In a right shift circuit 36 (SR7), the output of the subtracter 34 is shifted down by 7 bits, and output as a prediction value of the transform coefficient y (0,4). In a right shift circuit 37 (SR6), the output of the subtracter 34 is shifted down by 6 bits, and output as an prediction value of the transform coefficient y (0,6). In a right shift circuit 38 (SR3), the output of the subtracter 32 is shifted down by 3 bits, and output as a prediction value of the transform coefficient y (0,1). In a right shift circuit 39 (SR4), the output of the subtracter 32 is shifted down by 4 bits, and output as an prediction value of the transform coefficient y (0,3). In a right shift circuit 40 (SR5), the output of the subtracter 32 is shifted down by 5 bits, and output as a prediction value of the transform coefficient y (0,7).

The prediction values of the transform coefficients of zero-order in the horizontal direction and N-th order in the vertical direction are obtained according to the above procedure as follows:

For N=1, (Dn-Ds)/8
For N=2, (Dn-2Dc+Ds)/32
For N=3, (Dn-Ds)/16
For N=4, (Dn-2Dc+Ds)/128
For N=6, (Dn-2Dc+Ds)/64
For N=7, (Dn-Ds)/32

FIG. 6 is a block diagram showing an embodiment of the predictor 122shown in FIG. 4. In the predictor 122, the prediction values of the AC coefficients y(1,0), y(2,0), y(3,0),y(4,0), y(6,0), and y(7,0) are calculated on the basis of the DC coefficients Dw, Dc, and De of the center block and the right and left blocks.

The predictor 122 may be designed in the same structure as the predictor 121 shown in FIG. 5, except for the difference of the input/output signal between these predictors. An adder 41 adds Dw and De, and a subtracter 42 subtracts De from Dw. The value of Dc is shifted up by 1 bit in a left shift circuit 43 (SL1). A subtracter subtracts the output of the left shift circuit 43 from the output of the adder 41. In a right shift circuit 45 (SR5), the output of the subtracter 44 is shifted down by 5 bits, and output as a prediction value of the transform coefficient y(2,0). In a right shift circuit 46 (SR7), the output of the subtracter 44 is shifted down by 7 bits, and output as a prediction value of the transform coefficient y(4,0).

In a right shift circuit 47 (SR6), the output of the subtracter 44 is shifted down by 6 bits, and output as a prediction value of the transform coefficient y(6,0). In a right shift circuit 48 (SR3), the output of the subtracter 42 is shifted down by 3 bit, and output as a prediction value of the transform coefficient y(1,0). In a right shift circuit 49 (SR4), the output of the subtracter 42 is shifted down by 4 bits, and output as a prediction value of the transform coefficient y(3,0). In a right shift circuit 50 (SR5), the output of the subtracter 42 is shifted down by 5 bits, and output as a prediction value of the transform coefficient y(7,0).

The prediction values of the transform coefficients of M-th order in the horizontal direction and zero-order in the vertical direction are obtained according to the above procedure as follows:

For M=1, (Dw-De)/8

For M=2, (Dw-2Dc+De)/32

For M=3, (Dw-De)/16

For M=4, (Dw-2Dc+De)/128

For M=6, (Dw-2Dc+De)/64

For M=7, (Dw-De)/32

Figure 7:
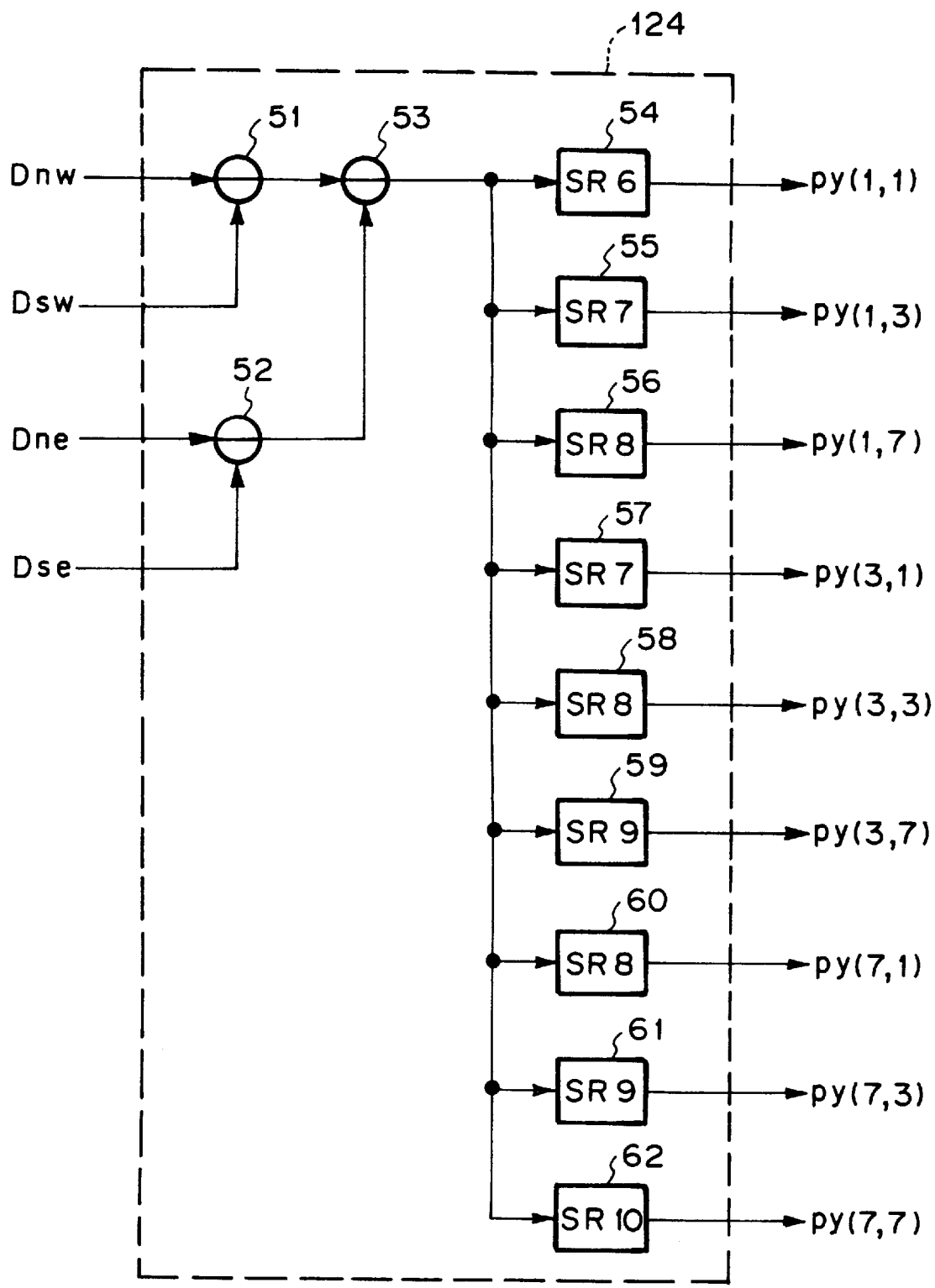
FIG. 7 is a block diagram showing an embodiment of an predictor 124.

FIG. 7 is a block diagram showing an embodiment of the predictor 124 shown in FIG. 4. The prediction values of the AC coefficients y(1,1), y(1,3), y(1,7), y(3,1), y(3,3), y(3,7), y(7,1), y(7,3), and y(7,7) are calculated on the basis of the DC coefficients Dnw, Dne, Dsw, and Dse of the upper-left, upper-right, lower-left, and lower-right blocks in the predictor 124.

The DC coefficient Dsw is subtracted from Dnw in a subtracter 51, and Dse is subtracted from Dne in a subtracter 52. A subtracter 53 subtracts the output of the subtracter 52 from the output of the subtracter 51. In a right shift circuit 54 (SR6), the output of the subtracter 53 is shifted down by 6 bits, and output as a prediction value of the transform coefficient y(1,1). In a right shift circuit 55 (SR7), the output of the subtracter 53 is shifted down by 7 bits, and output as a prediction value of the transform coefficient y(1,3). In a right shift circuit 56 (SR8), the output of the subtracter 53 is shifted down by 8 bits, and output as a prediction value of the transform coefficient y(1,7).

In a right shift circuit 57 (SR7), the output of the subtracter 53 is shifted down by 7 bits, and output as a prediction value of the transform coefficient y(3,1). In a right shift circuit 58 (SR8), the output of the subtracter 53 is shifted down by 8 bits, and output as a prediction value of the transform coefficient y(3,3). In a right shift circuit 59 (SR9), the output of the subtracter 53 is shifted down by 9 bits, and output as a prediction value of the transform coefficient y(3,7). In a right shift circuit 60 (SR8), the output of the subtracter 53 is shifted down by 8 bits, and output as a prediction value of the transform coefficient y(7,1). In a right shift circuit 61 (SR9), the output of the subtracter 53 is shifted down by 9 bits, and output as a prediction value of the transform coefficient y(7,3). In a right shift circuit 62 (SR10), the output of the subtracter 53 is shifted down by 10 bits, and output as a prediction value of the transform coefficient y(7,7).

The prediction values of the transform coefficient of M-th order in the horizontal direction and N-th order in the vertical direction are obtained according to the above procedure as follows:

For M=1, N=1, (Dnw-Dne-Dsw+Dse)/64

For M=1, N=3, (Dnw-Dne-Dsw+Dse)/128

For M=1, N=7, (Dnw-Dne-Dsw+Dse)/256

For M=3, N=1, (Dnw-Dne-Dsw+Dse)/128

For M=3, N=3, (Dnw-dne-Dsw+Dse)/256

For M=3, N=7, (Dnw-Dne-Dsw+Dse)/512

For M=7, N=1, (Dnw-Dne-Dsw+Dse)/256

For M=7, N=3, (Dnw-Dne-Dsw+Dse)/512

For M=7, N=7, (Dnw-Dne-Dsw+Dse)/1024.

FIG. 8 is a block diagram showing an example of the predictor 125 shown in FIG. 4. The prediction values of the AC coefficients y(1,2), y(1,4), y(1,6), y(3,2), y(3,4), y(3,6), y(7,2), y(7,4), and y(7,6) are calculated on the basis of the DC coefficients Dnw, Dne, Dw, De, Dsw, and Dse of the upper-left, upper-right, left, right, lower-left and lower-right blocks in the predictor 125.

An adder 63 adds the DC coefficient Dnw and Dsw, and a left shift circuit 64 (SL1) shifts up the value of Dw by 1 bit. A subtracter 65 subtracts the output of a left shift circuit 64 (SL1) from the output of the adder 63. An adder 67 adds Dne and Dse. A left shift circuit 68 (SL1) shifts up the value of De by 1 bit, and a subtracter 69 subtracts the output of the left shift circuit 68 (SL1) from the output of the adder 67.

A subtracter 66 subtracts the output of the subtracter 69 from the output of the subtracter 65. A right shift circuit 70 (SR8) shifts down the output of the subtracter 66 by 8 bits, and then outputs the result of shifting it down as a prediction value of the transform coefficient y(1,2). A right shift circuit 71 (SR10) shifts down the output of the subtracter 66 by 10 bits, and outputs it as a prediction value of the transform coefficient y(1,4). A right shift circuit 72 (SR9) shifts down the output of the subtracter 66 by 9 bits, and then outputs it as a prediction value of the transform coefficient y(1,6).

A right shift circuit 73 (SR9) shifts down the output of the subtracter 66 by 9 bits, and then outputs it as a prediction value of the transform coefficient y(3,2). A right shift circuit 74 (SR11) shifts down the output of the subtracter 66 by 11 bits, and outputs it as a prediction value of the transform coefficient y(3,4). A right shift circuit 75 (SR10) shifts down the output of the subtracter 66 by 10 bits, and then outputs it as a prediction value of the coefficient transform y(3,6). A right shift circuit 76 (SR10) shifts down the output of the subtracter 66 by 10 bits, and outputs it as a prediction value of the transform coefficient y(7,2). A right shift circuit 77 (SR12) shifts down the output of the subtracter 66 by 12 bits, and then outputs it as a prediction value of the transform coefficient y(7,4). A right shift circuit 78 (SR11) shifts down the output of the subtracter 66 by 11 bits, and then outputs it as a prediction value of the transform coefficient y(7,6).

Figure 9:
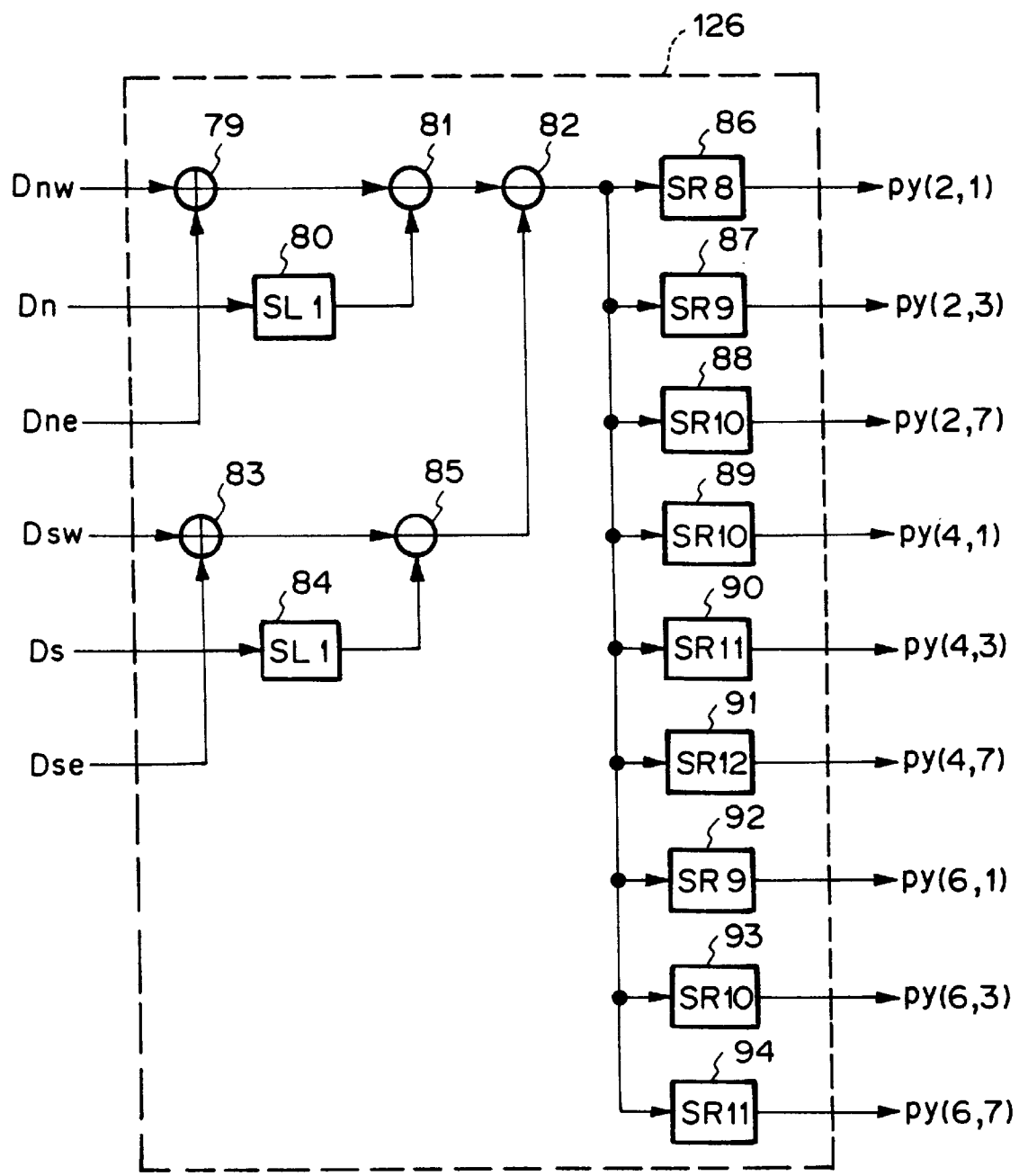
FIG. 9 is a block diagram showing an embodiment of an predictor 126.

FIG. 9 is a diagram showing an embodiment of the predictor 126 shown in FIG. 4. In this predictor, the prediction values of the AC coefficients y(2,1), y(2,3), y(2,7), y(4,1), y(4,3), y(4,7), y(6,1), y(6,3), and y(6,7) are calculated on the basis of the DC coefficients Dnw, Dn, Dne, Dsw, Ds, and Dse of the upper-left, upper, upper-right, lower-left, lower, and right-lower blocks. The predictor 126 may be designed in the same structure as the predictor 125 shown in FIG. 8, except for the difference in input/output signals between these predictors.

An adder 79 adds the DC coefficient Dnw and Dne. A left shift circuit 80 (SL1) shifts up the value of Dn by 1 bit. A subtracter 81 subtracts the output of the left shift circuit 80 (SL1) from the output of the adder 79. An adder 83 adds the DC coefficient Dsw and Dse. A left shift circuit 84 (SL1) shifts up the value of Ds by 1 bit. A subtracter 85 subtracts the output of a left shift circuit 84 (SL1) from the output of the adder 83. A subtracter 82 subtracts the output of the subtracter 85 from the output of the subtracter 81. A right shift circuit 86 (SR8) shifts down the output of the subtracter 82 by 8 bits, and then outputs it as an prediction value of the transform coefficient y(2,1). A right shift circuit 87 (SR9) shifts down the output of the subtracter 82 by 9 bits, and then outputs it as a prediction value of the transform coefficient y(2,3). A right shift circuit 88 (SR10) shifts down the output of the subtracter 82 by 10 bits, and then outputs it as a prediction value of the transform coefficient y(2,7). A right shift circuit 89 (SR10) shifts down the output of the subtracter 82 by 10 bits, and then outputs it as a prediction value of the transform coefficient y(4,1). A right shift circuit 90 (SR11) shifts down the output of the subtracter 82 by 11 bits, and then outputs it as a prediction value of the transform coefficient y(4,3).

A right shift circuit 91 (SR12) shifts down the output of the subtracter 82 by 12 bits, and then outputs it as a prediction value of the transform coefficient y(4,7). A right shift circuit 92 (SR9) shifts down the output of the subtracter 82 by 9 bits, and then outputs it as a prediction value of the transform coefficient y(6,1). A right shift circuit 93 (SR10) shifts down the output of the subtracter 82 by 10 bits, and then outputs it as a prediction value of the transform coefficient y(6,3). A right shift circuit 94 (SR11) shifts down the output of the subtracter 82 by 11 bits, and then outputs it as a prediction value of the transform coefficient y(6,7).

Figure 10:
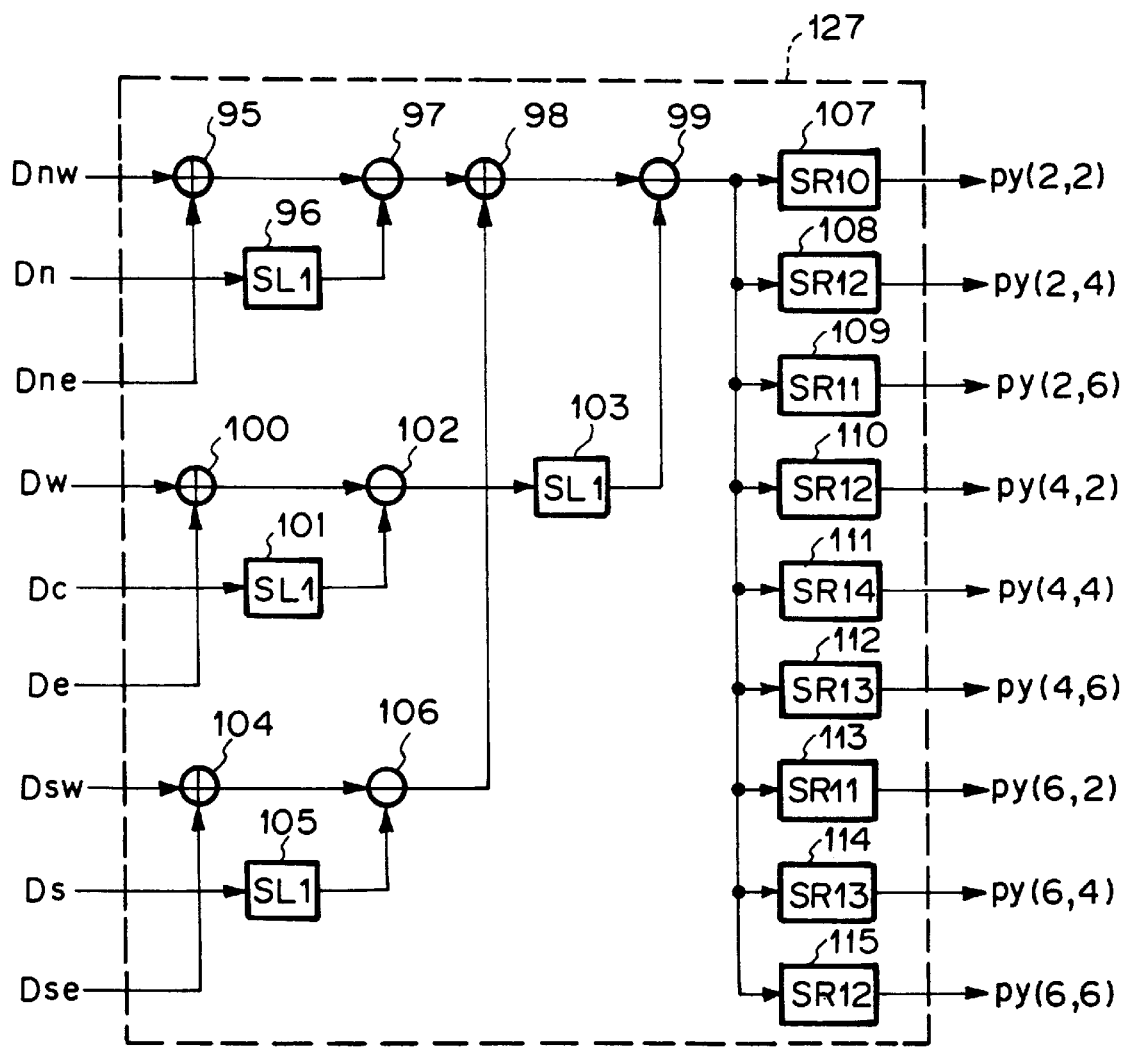
FIG. 10 is a block diagram showing an embodiment of an predictor 127.

FIG. 10 is a block diagram showing an embodiment of the predictor 127 shown in FIG. 4. In the predictor 127, the prediction values of the AC coefficients y(2,2), y(2,4), y(2,6), y(4,2), y(4,4), y(4,6), y(6,2), y(6,4), and 7(6,6) are calculated on the basis of the DC coefficients of nine blocks shown in FIG. 4.

An adder 95 adds the DC coefficient Dnw and Dne, and a left shift circuit 96 (SL1) shifts up the value of Dn by 1 bit. A subtracter 97 subtracts the output of the left shift circuit 96 (SL1) from the output of the adder 95. An adder 100 adds Dw and De. A left shift circuit 101 (SL1) shifts up the value of Dc by 1 bit. A subtracter 102 subtracts the output of the left shift circuit 101 (SL1) from the output of the adder 100. An adder 104 adds Dsw and Dse. A left shift circuit 105 (SL1) shifts up the value of Ds by 1 bit. A subtracter 106 subtracts the output of the left shift circuit 105 (SL1) from the output of the adder 104. An adder 98 adds the output of the subtracter 97 and the output of the subtracter 106.

A left shift circuit 103 shifts up the output of the subtracter 102 by 1 bit, and a subtracter 99 subtracts the output of the left shift circuit 103 (SL1) from the output of the adder 98. A right shift circuit 107 (SR10) shifts down the output of the subtracter 99 by 10 bits, and outputs it as a prediction value of the transform coefficient y(2,2). A right shift circuit 108 (SR12) shifts down the output of the subtracter 99 by 12 bits, and outputs it as a prediction value of the transform coefficient y(2,4). A right shift circuit 109 (SR11) shifts down the output of the subtracter 99 by 11 bits, and outputs it as a prediction value of the transform coefficient y(2,6). A right shift circuit 110 (SR12) shifts down the output of the subtracter 99 by 12 bits, and outputs it as a prediction value of the transform coefficient y(4,2). A right shift circuit 111(SR14) shifts down the output of the subtracter 99 by 14 bits, and then outputs it as a prediction value of the transform coefficient y(4,4). A right shift circuit 112 (SR13) shifts down the output of the subtracter 99 by 13 bits, and outputs it as a prediction value of the transform coefficient y(4,6). A right shift circuit 113 (SR11) shifts down the output of the subtracter 99 by 11 bits, and then outputs it as a prediction value of the transform coefficient y(6,2). A right shift circuit 114 (SR13) shifts down the output of the subtracter 99 by 13 bits, and then outputs it as a prediction value of the transform coefficient y(6,4). A right shift circuit 115 (SR12) shifts down the output of the subtracter 99 by 12 bits, and then outputs it as a prediction value of the transform coefficient y(6,6).

The prediction values of the transform coefficient of M-th order in the horizontal direction and N-th order in the vertical direction are obtained according to the above procedures as follows:

For M=1, N=2, (Dnw-2Dw+Dsw-Dne+2De-Dse)/256

For M=1, N=4, (Dnw-2Dw+Dsw-Dne+2De-Dse)/1024

For M=1, N=6, (Dnw-2Dw+Dsw-Dne+2De-Dse)/512

For M=2, N=1, (Dnw-2Dn+Dne-Dsw+2Ds-Dse)/256

For M=2, N=2, (Dnw-2Dn+Dne-2Dw+4Dc-2De+Dsw-2Ds+Dse)/1024

For M=2, N=3, (Dnw-2Dn+Dne-Dsw+2Ds-Dse)/512

For M=2, N=4, (Dnw-2Dn+Dne-2Dw+4Dc-2De+Dsw-2Ds+Dse)/4096

For M=2, N=6, (Dnw-2Dn+Dne-2Dw+4Dc-2De+Dsw-2Ds+Dse)/2048

For M=2, N=7, (Dnw-2Dn+Dne-Dsw+2Ds-Dse)/1024

For M=3, N=2, (Dnw-2Dw+Dsw-Dne+2De-Dse)/512

For M=3, N=4, (Dnw-2Dw+Dsw-Dne+2De-Dse)/2048

For M=3, N=6, (Dnw-2Dw+Dsw-Dne+2De-Dse)/1024

For M=4, N=1, (Dnw-2Dn+Dne-Dsw+2Ds-Dse)/1024

For M=4, N=2, (Dnw-2Dn+Dne-2Dw+4Dc-2De+Dsw-2Ds+Dse)/4096

For M=4, N=3, (Dnw-2Dn+Dne-Dsw+2Ds-Dse)/2048

For M=4, N=4, (Dnw-2Dn+Dne-2Dw+4Dc-2De+Dsw-2Ds+Dse)/16384

For M=4, N=6, (Dnw-2Dn+Dne-2Dw+4Dc-2De+Dsw-2Ds+Dse)/8192

For M=4, N=7, (Dnw-2Dn+Dne-Dsw+2Ds-Dse)/4096

For M=6, N=1, (Dnw-2Dn+Dne-Dsw+2Ds-Dse)/512

For M=6, N=2, (Dnw-2Dn+Dne-2Dw+4Dc-2De+Dsw-2Ds+Dse)/2048

For M=6, N=3, (Dnw-2Dn+Dne-Dsw+2Ds-Dse)/1024

For M=6, N=4, (Dnw-2Dn+Dne-2Dw+4Dc-2De+Dsw-2Ds+Dse)/8192

For M=6, N=6, (Dnw-2Dn+Dne-2Dw+4Dc-2De+Dsw-2Ds+Dse)/4096

For M=6, N=7, (Dnw-2Dn+Dne-Dsw+2Ds-Dse)/2048

For M=7, N=2, (Dnw-2Dw+Dsw-Dne+2De-Dse)/1024

For M=7, N=4, (Dnw-2Dw+Dsw-Dne+2De-Dse)/4096

For M=7, N=6, (Dnw-2Dw+Dsw-Dne+2De-Dse)/2048

Figure 13:
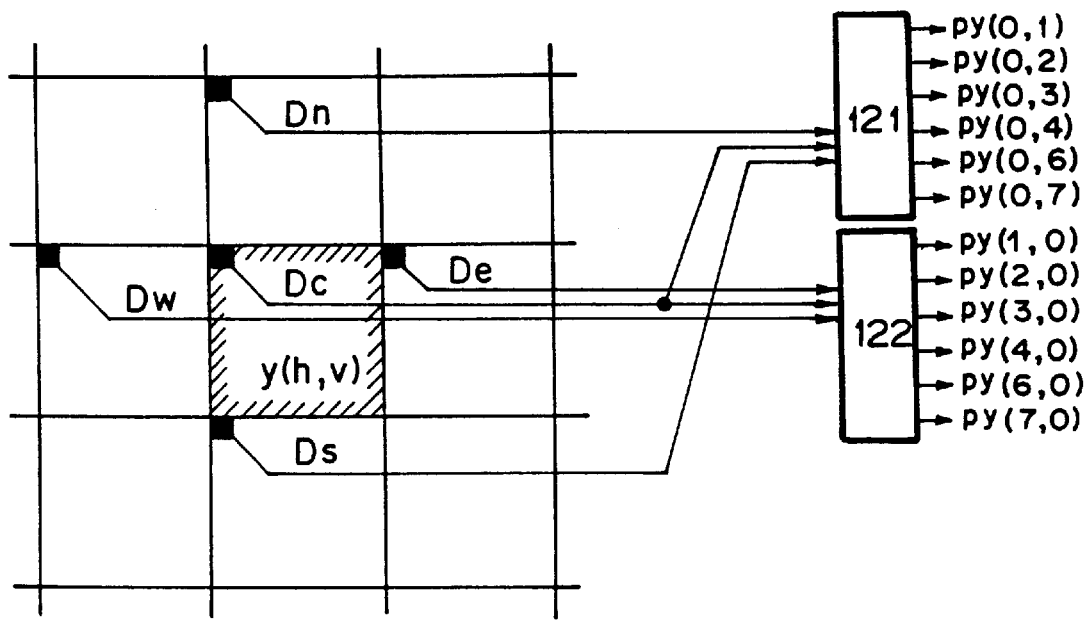
FIG. 13 is a block diagram showing a second embodiment of the AC coefficient predictors 12 and 22.
Figure 14:
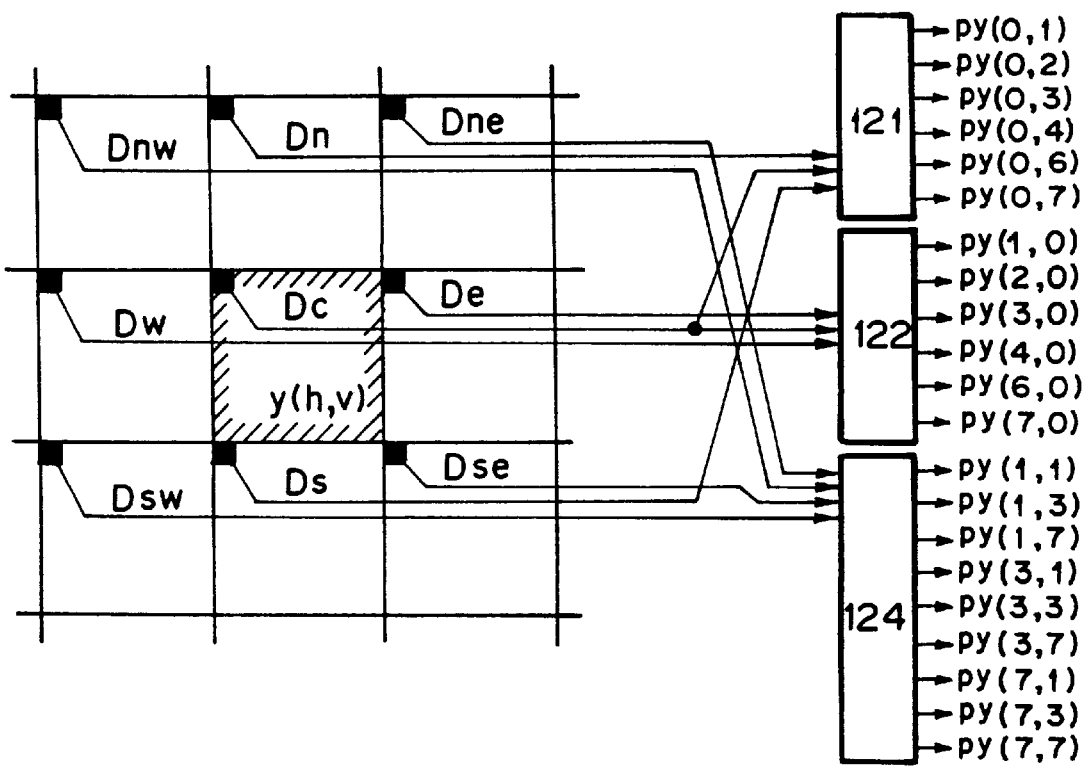
FIG. 14 is a block diagram showing a third embodiment of the AC coefficient predictors 12 and 22.

In the embodiment as described above, 48 AC coefficients are predicted in the case of FIG. 4. However, a sufficient coding amount reducing effect can be obtained by merely predicting the coefficients at the low frequency area. FIGS. 13 and 14 show a case where 12 low-area AC coefficients are predicted and a case where 21 low-area AC coefficients are predicted. The operation of the predictors 121, 122 and 124 shown in FIGS. 13 and 14 are identical to that of FIG. 4. In the case of FIG. 13, the DC coefficients of only the center block and four adjacent blocks are prepared for the prediction. In the case of FIG. 14, the DC coefficients of nine blocks are prepared for the prediction, and only the low-area AC coefficients are predicted.

According to the embodiments as described above, the prediction error of the AC coefficient is coded, so that the coding amount of the AC coefficients can be reduced by utilizing smoothness of image signals, resulting in reduction in the memory capacity required to record information on transform coefficients or the line capacity required to transmit the information on the transform coefficients.

The present invention is not limited to the above-described embodiments, and various modifications may be made without departing from the subject matter of the present invention.

As described above, in the Hadamard transform coding device for image signals according to the present invention, the two-dimensional Hadamard transform processing is performed on input image signals, and the DC coefficients thus obtained are subjected to the variable-length coding processing. Subsequently, the AC coefficients of a block concerned are predicted on the basis of the DC coefficients of the block concerned and other blocks which are adjacent to the block concerned. The predicted AC coefficients are subtracted from the AC coefficients thus obtained, and the subtraction result is subjected to the variable-length coding to coding the prediction error of the AC coefficients. Therefore, the present invention is more effectively applied to a smooth signals than signals including many edges, and the coding amount of the AC coefficients can be reduced by utilizing the smoothness of the image signals, resulting in reduction in the memory capacity required to record information on transform coefficients or the line capacity required to transmit the information on the transform coefficients.

What is claimed is:

1. A Hadamard transform coding device for image signals comprising:

Hadamard transform means for dividing input image signals every block and performing two-dimensional Hadamard transform on the blocks of the input signals;

DC coefficient variable-length coding means for performing variable-length coding processing on DC coefficients obtained by said Hadamard transform means;

AC coefficient predicting means for predicting AC coefficients of a block concerned on the basis of the DC coefficients of the block concerned and blocks adjacent to the block concerned;

subtracting means for subtracting the output of said AC coefficient predicting means from the AC coefficients which are obtained by said Hadamard transform means; and AC coefficient variable-length coding means for performing variable-length coding on the output of said subtraction means, wherein with respect to two-dimensional (8×8)-th order Hadamard transform coefficients, said AC coefficient predicting means is input with a DC coefficient Dc of a block concerned, a DC coefficient Dn of a block located just above the block concerned, a DC coefficient Ds of a block located just below the block concerned, a DC coefficient Dw of a block just pre-ceding to the block concerned, a DC coefficient De of a block just subsequent to the block concerned, and outputs as a prediction value of the transform coefficient of M-th order in a horizontal direction and zero-order in a vertical direction:

(Dw−De)/8 for M=1;
(Dw−2Dc+De)/32 for M=2;
(Dw−De)/16 for M=3;
(Dw−2Dc+De)/128 for M=4;
(Dw−2Dc+De)/64 for M=6; and
(Dw−De)/32 for M=7, and outputs as a prediction value of the transform coefficient of zero-order in the horizontal direction and N-th order in the vertical direction:

(Dn−Ds)/8 for N=1;
(Dn−2Dc+Ds)/32 for N=2;
(Dn−Ds)/16 for N=3;
(Dn−2Dc+Ds)/128 for N=4;
(Dn−2Dc+Ds)/64 for N=6; and
(Dn−Ds)/32 for N=7, wherein the image signals are smooth signals and thereby a coding amount of the AC coefficients is reduced.

2. The Hadamard transform coding device as claimed in claim 1, wherein said AC coefficient predicting means is input with a DC coefficient Dnw of a block at the upper-and-left side of the block concerned, a DC coefficient Dne of a block at the upper-and-right side of the block concerned, a DC coefficient Dsw of a block at the lower-and-left side of the block concerned, and a DC coefficient Dse of a block at the lower-and-right side of the block concerned, and outputs as a prediction value of the transform coefficient of M-th order in the horizontal direction and N-th order in the vertical direction:

(Dnw−Dne−Dsw+Dse)/64 for M=1, N=1;
(Dnw−Dne−Dsw+Dse)/128 for M=1, N=3;
(Dnw−Dne−Dsw+Dse)/256 for M=1, N=7;
(Dnw−Dne−Dsw+Dse)/128 for M=3, N=1;
(Dnw−Dne−Dsw+Dse)/256 for M=3, N=3;
(Dnw−Dne−Dsw+Dse)/512 for M=3, N=7;
(Dnw−Dne−Dsw+Dse)/256 for M=7, N=1;
(Dnw−Dne−Dsw+Dse)/512 for M=7, N=3; and
(Dnw−Dne−Dsw+Dse)/1024 for M=7, N=7.

3. The Hadamard transform coding device as claimed in claim 2, wherein said AC coefficient predicting means is input with the DC coefficient Dc of the block concerned, the DC coefficient Dnw of the upper-left block, the DC coefficient Dn of the just-above block, the DC coefficient Dne of the just-upper-right block, the DC coefficient Dw of the just-preceding block, the DC coefficient De of the just-subsequent block, the DC coefficient Dsw of the lower-left block, the DC coefficient Ds of the just-below block, and the DC coefficient Dse of the lower-right block, and outputs as a prediction value of the transform coefficient of M-th order in the horizontal direction and N-th order in the vertical direction:

(Dnw−2Dw+Dsw−Dne+2De−Dse)/256 for M=1, N=2;
(Dnw−2Dw+Dsw−Dne+2De−Dse)/1024 for M=1, N=4;
(Dnw−2Dw+Dsw−Dne+2De−Dse)/512 for M=1, N=6;
(Dnw−2Dn+Dne−Dsw+2Ds−Dse)/256 for M=2, N=1;
(Dnw−2Dn+Dne−2Dw+4Dc−2De+Dsw−2Ds+Dse)/1024 for M=2, N=2;
(Dnw−2Dn+Dne−Dsw+2Ds−Dse)/512 for M=2, N=3;
(Dnw−2Dn+Dne−2Dw+4Dc−2De+Dsw−2Ds+Dse)/4096 for M=2, N=4;

$(Dnw-2Dn+Dne-2Dw+4Dc-2De+Dsw-2Ds+Dse)/2048$ for M=2, N=6;
$(Dnw-2Dn+Dne-Dsw+2Ds-Dse)/1024$ for M=2, N=7;
$(Dnw-2Dw+Dsw-Dne+2De-Dse)/512$ for M=3, N=2;
$(Dnw-2Dw+Dsw-Dne+2De-Dse)/2048$ for M=3, N=4;
$(Dnw-2Dw+Dsw-Dne+2De-Dse)/1024$ for M=3, N=6;
$(Dnw-2Dn+Dne-Dsw+2Ds-Dse)/1024$ for M=4, N=1;
$(Dnw-2Dn+Dne-2Dw+4Dc-2De+Dsw-2Ds+Dse)/4096$ for M=4, N=2;
$(Dnw-2Dn+Dne-Dsw+2Ds-Dse)/2048$ for M=4, N=3;
$(Dnw-2Dn+Dne-2Dw+4Dc-2De+Dsw-2Ds+Dse)/16384$ for M=4, N=4;
$(Dnw-2Dn+Dne-2Dw+4Dc-2De+Dsw-2Ds+Dse)/8192$ for M=4, N=6;
$(Dnw-2Dn+Dne-Dsw+2Ds-Dse)/4096$ for M=4, N=7;
$(Dnw-2Dn+Dne-Dsw+2Ds-Dse)/512$ for M=6, N=1;
$(Dnw-2Dn+Dne-2Dw+4Dc-2De+Dsw-2Ds+Dse)/2048$ for M=6, N=2;
$(Dnw-2Dn+Dne-Dsw+2Ds-Dse)/1024$ for M=6, N=3;
$(Dnw-2Dn+Dne-2Dw+4Dc-2De+Dsw-2Ds+Dse)/8192$ for M=6, N=4;
$(Dnw-2Dn+Dne-2Dw+4Dc-2De+Dsw-2Ds+Dse)/4096$ for M=6, N=6;
$(Dnw-2Dn+Dne-Dsw+2Ds-Dse)/2048$ for M=6, N=7;
$(Dnw-2Dw+Dsw-Dne+2De-Dse)/1024$ for M=7, N=2;
$(Dnw-2Dw+Dsw-Dne+2De-Dse)/4096$ for M=7, N=4; and
$(Dnw-2Dw+Dsw-Dne+2De-Dse)/2048$ for M=7, N=6.

4. A Hadamard transform decoding device for image signals comprising:

DC coefficient variable-length decoding means for performing variable-length decoding processing on DC coefficients which have been subjected to variable-length coding processing;

AC coefficient variable-length decoding means for performing variable-length decoding processing on an AC coefficient prediction error which has been subjected to variable-length coding processing;

AC coefficient predicting means for predicting the AC coefficients of a block concerned on the basis of the DC coefficients of the block concerned and blocks adjacent to the block concerned which are obtained by said DC coefficient variable-length decoding means;

adding means for adding the output of said AC coefficient predicting means to the output of the AC coefficient variable-length decoding means; and Hadamard inverse-transform means for performing Hadamard inverse-transform on the DC coefficient obtained by said DC coefficient variable-length decoding means and the AC coefficients obtained by said adding means every block, wherein with respect to Hadamard transform coefficients of two-dimensional (8x8)-th order, said AC coefficient predicting means is input with the DC coefficient Dc of the block concerned, the DC coefficient Dn of a just-above block, the DC coefficient Ds of a just-below block, the DC coefficient Dw of a just-preceding block, the DC coefficient De of a just-subsequent block, and outputs as a prediction value of the transform coefficient of the M-th order in the horizontal direction and the zero-order in the vertical direction:

$(Dw-De)/8$ for M=1;
$(Dw-2Dc+De)/32$ for M=2;
$(Dw-De)/16$ for M=3;
$(Dw-2Dc+De)/128$ for M=4;
$(Dw-2Dc+De)/64$ for M=6; and
$(Dw-De)/32$ for M=7, and outputs as a prediction value of the transform coefficient of zero-order in the horizontal direction and N-th order in the vertical direction:

$(Dn-Ds)/8$ for N=1;
$(Dn-2Dc+Ds)/32$ for N=2;
$(Dn-Ds)/16$ for N=3;
$(Dn-2Dc+Ds)/128$ for N=4;
$(Dn-2Dc+Ds)/64$ for N=6; and
$(Dn-Ds)/32$ for N=7, wherein the image signals are smooth signals and thereby a coding amount of the AC coefficients is reduced.

5. The Hadamard transform decoding device as claimed in claim 4, wherein said AC coefficient predicting means is input with the DC coefficient Dnw of an upper-left block, the DC coefficient Dne of an upper-right block, the DC coefficient Dsw of a lower-left block, and the DC coefficient Dse of a lower-right block, and outputs as a prediction value of the transform coefficient of M-th order in the horizontal direction and N-th order in the vertical direction:

$(Dnw-Dne-Dsw+Dse)/64$ for M=1, N=1;
$(Dnw-Dne-Dsw+Dse)/128$ for M=1, N=3;
$(Dnw-Dne-Dsw+Dse)/256$ for M=1, N=7;
$(Dnw-Dne-Dsw+Dse)/128$ for M=3, N=1;
$(Dnw-Dne-Dsw+Dse)/256$ for M=3, N=3;
$(Dnw-Dne-Dsw+Dse)/512$ for M=3, N=7;
$(Dnw-Dne-Dsw+Dse)/256$ for M=7, N=1;
$(Dnw-Dne-Dsw+Dse)/512$ for M=7, N=3; and
$(Dnw-Dne-Dsw+Dse)/1024$ for M=7, N=7.

6. The Hadamard transform decoding device as claimed in claim 5, wherein said AC coefficient predicting means is input with the DC coefficient Dc of the block concerned, the DC coefficient Dnw of an upper-left block, the DC coefficient Dn of a just-above block, the DC coefficient Dne of an upper-right block, the DC coefficient Dw of a just-preceding block, the DC coefficient De of a just-subsequent block, the DC coefficient Dsw of a lower-left block, the DC coefficient Ds of a just-below block, and the DC coefficient Dse of a lower-right block, and outputs as a prediction value of the transform coefficient of M-th order in the horizontal direction and N-th order in the vertical direction:

$(Dnw-2Dw+Dsw-Dne+2De-Dse)/256$ for M=1, N=2;
$(Dnw-2Dw+Dsw-Dne+2De-Dse)/1024$ for M=1, N=4;
$(Dnw-2Dw+Dsw-Dne+2De-Dse)/512$ for M=1, N=6;
$(Dnw-2Dn+Dne-Dsw+2Ds-Dse)/256$ for M=2, N=1;
$(Dnw-2Dn+Dne-2Dw+4Dc-2De+Dsw-2Ds+Dse)/1024$ for M=2, N=2;
$(Dnw-2Dn+Dne-Dsw+2Ds-Dse)/512$ for M=2, N=3;
$(Dnw-2Dn+Dne-2Dw+4Dc-2De+Dsw-2Ds+Dse)/4096$ for M=2, N=4;
$(Dnw-2Dn+Dne-2Dw+4Dc-2De+Dsw-2Ds+Dse)/2048$ for M=2, N=6;
$(Dnw-2Dn+Dne-Dsw+2Ds-Dse)/1024$ for M=2, N=7;
$(Dnw-2Dw+Dsw-Dne+2De-Dse)/512$ for M=3, N=2;
$(Dnw-2Dw+Dsw-Dne+2De-Dse)/2048$ for M=3, N=4;
$(Dnw-2Dw+Dsw-Dne+2De-Dse)/1024$ for M=3, N=6;
$(Dnw-2Dn+dne-Dsw+2Ds-Dse)/1024$ for M=4, N=1;

$(D_{nw}-2D_n+D_{ne}-2D_w+4D_c-2D_e+D_{sw}-2D_s+D_{se})/4096$ for M=4, N=2;

$(D_{nw}-2D_n+D_{ne}-D_{sw}+2D_s-D_{se})/2048$ for M=4, N=3;

$(D_{nw}-2D_n+D_{ne}-2D_w+4D_c-2D_e+D_{sw}-2D_s+D_{se})/16384$ for M=4, N=4;

$(D_{nw}-2D_n+D_{ne}-2D_w+4D_c-2D_e+D_{sw}-2D_s+D_{se})/8192$ for M=4, N=6;

$(D_{nw}-2D_n+D_{ne}-D_{sw}+2D_s-D_{se})/4096$ for M=4, N=7;

$(D_{nw}-2D_n+D_{ne}-D_{sw}+2D_s-D_{se})/512$ for M=6, N=1;

$(D_{nw}-2D_n+D_{ne}-2D_w+4D_c-2D_e+D_{sw}-2D_s+D_{se})/2048$ for M=6, N=2;

$(D_{nw}-2D_n+D_{ne}-D_{sw}+2D_s-D_{se})/1024$ for M=6, N=3;

$(D_{nw}-2D_n+D_{ne}-2D_w+4D_c-2D_e+D_{sw}-2D_s+D_{se})/8192$ for M=6, N=4;

$(D_{nw}-2D_n+D_{ne}-2D_w+4D_c-2D_e+D_{sw}-2D_s+D_{se})/4096$ for M=6, N=6;

$(D_{nw}-2D_n+D_{ne}-D_{sw}+2D_s-D_{se})/2048$ for M=6, N=7;

$(D_{nw}-2D_w+D_{sw}-D_{ne}+2D_e-D_{se})/1024$ for M=7, N=2;

$(D_{nw}-2D_w+D_{sw}-D_{ne}+2D_e-D_{se})/4096$ for M=7, N=4; and $(D_{nw}-2D_w+D_{sw}-D_{ne}+2D_e-D_{se})/2048$ for M=7, N=6.

* * * * *